United States Patent
Sun et al.

(10) Patent No.: US 11,339,328 B2
(45) Date of Patent: May 24, 2022

(54) LIQUID CRYSTAL COMPOSITION CONTAINING POLYMERIZABLE COMPOUND AND DISPLAY DEVICE THEREOF

(71) Applicant: Jiangsu Hecheng Display Technology Co., Ltd., Yangzhong (CN)

(72) Inventors: Chenglong Sun, Yangzhong (CN); Wenquan Ding, Yangzhong (CN); Haibin Xu, Yangzhong (CN); Shuang Xu, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 0 days.

(21) Appl. No.: 17/184,045

(22) Filed: Feb. 24, 2021

(65) Prior Publication Data

US 2021/0284910 A1    Sep. 16, 2021

(30) Foreign Application Priority Data

Mar. 9, 2020  (CN) .......................... 202010158210.9

(51) Int. Cl.
| | |
|---|---|
| *G02F 1/1334* | (2006.01) |
| *C09K 19/12* | (2006.01) |
| *C09K 19/20* | (2006.01) |
| *C09K 19/30* | (2006.01) |
| *C09K 19/18* | (2006.01) |

(52) U.S. Cl.
CPC .............. *C09K 19/12* (2013.01); *C09K 19/18* (2013.01); *C09K 19/2028* (2013.01); *C09K 19/3003* (2013.01); *C09K 19/3028* (2013.01); *C09K 19/3048* (2013.01); *C09K 19/3068* (2013.01); *C09K 19/3087* (2013.01); *C09K 2019/123* (2013.01); *C09K 2019/183* (2013.01); *C09K 2019/185* (2013.01); *C09K 2019/186* (2013.01); *C09K 2019/188* (2013.01); *C09K 2019/2042* (2013.01); *C09K 2019/2078* (2013.01); *C09K 2019/2085* (2013.01); *C09K 2019/2092* (2013.01); *C09K 2019/301* (2013.01); *C09K 2019/3006* (2013.01); *C09K 2019/3013* (2013.01); *C09K 2019/3016* (2013.01); *C09K 2019/3018* (2013.01); *C09K 2019/3031* (2013.01); *C09K 2019/3037* (2013.01); *C09K 2019/3051* (2013.01); *C09K 2019/3054* (2013.01); *C09K 2019/3056* (2013.01); *C09K 2019/3071* (2013.01); *C09K 2019/3077* (2013.01); *C09K 2019/3081* (2013.01); *C09K 2019/3083* (2013.01); *C09K 2019/3092* (2013.01); *C09K 2019/3093* (2013.01)

(58) Field of Classification Search
CPC .... C09K 19/12; C09K 19/18; C09K 19/2028; C09K 19/3003; C09K 19/3028; C09K 19/44; C09K 2019/123; C09K 2019/2042; C09K 2019/2078; C09K 2019/2085; C09K 2019/2092; C09K 2019/0444; C09K 2019/0448; C09K 2019/38; C09K 2019/3804; G02F 1/1334
See application file for complete search history.

(56) References Cited

U.S. PATENT DOCUMENTS

2021/0284910 A1* 9/2021 Sun ..................... C09K 19/2028

FOREIGN PATENT DOCUMENTS

| | | | | |
|---|---|---|---|---|
| JP | 06043641 | * | 2/1994 | ............ G03F 7/028 |
| TW | 202009236 A | | 3/2020 | |

* cited by examiner

*Primary Examiner* — Geraldina Visconti
(74) *Attorney, Agent, or Firm* — Hoffmann & Baron, LLP

(57) ABSTRACT

A liquid crystal composition includes at least one compound of general Formula I, at least one compound of general Formula II and at least one compound of general Formula M. The polymerizable liquid crystal composition provides a higher VHR (especially an excellent VHR after UV irradiation), a lower surface roughness of the polymer layer, a faster polymerization rate, a lower residual amount of the polymerizable compound and a better pretilt angle stability, which enables the production of a liquid crystal display device with a better voltage stability and a faster response speed, and can effectively reduce or prevent the occurrences of problems such as "burn-in", "image sticking", "Zara Particle" and "uneven display" in the liquid crystal display device. A liquid crystal display includes the liquid crystal composition.

10 Claims, No Drawings

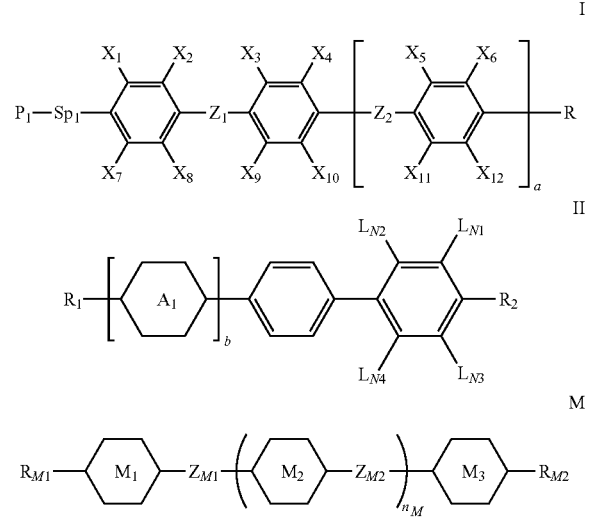

LIQUID CRYSTAL COMPOSITION CONTAINING POLYMERIZABLE COMPOUND AND DISPLAY DEVICE THEREOF

CROSS-REFERENCE TO RELATED APPLICATIONS

This application claims priority to and benefit of Chinese Patent Application No. 202010158210.9 filed on Mar. 9, 2020. The contents of the above application are hereby expressly incorporated by reference in its entirety into the present application, including the contents and teachings of any references contained therein.

TECHNICAL FIELD

The present invention relates to the field of liquid crystal material, particularly to a liquid crystal composition containing polymerizable compound and a liquid crystal display device comprising the same.

BACKGROUND ARTS

Liquid crystal displays (LCDs) have gained rapid development due to their small size, light weight, low power consumption and excellent display quality, and in particular, have been widely used in portable electronic information products. Based on the displaying mode, liquid crystal displays can be classified into the types of PC (phase change), TN (twisted nematic), STN (super twisted nematic), ECB (electrically controlled birefringence), OCB (optically compensated bend), IPS (in-plane switching), FFS (fringe field switching), VA (vertical alignment), PSA (polymer stable alignment), and the like.

A PSA-type liquid crystal display device is manufactured by adding a small amount (such as 0.3 wt. %, typically, <1 wt. %) of one or more polymerizable compounds into a liquid crystal composition, filling the same into a liquid crystal cell, and polymerizing, usually via a UV photopolymerization, or crosslinking the polymerizable compounds in suit under a condition where liquid crystal molecules are initially aligned with or without a voltage applied between electrodes, thereby fixing the alignment of the liquid crystal molecules. The polymerization is carried out at a temperature where the liquid crystal composition exhibits a liquid crystal phase, usually at room temperature. It has been proven that the addition of polymerizable liquid crystal compounds to a liquid crystal composition is particularly suitable since the polymer structure formed by the polymerizable liquid crystal compounds in the unit can well control the tilt angle of liquid crystal molecules, and that the PSA-type liquid crystal display device has a high response speed and a high contrast.

Therefore, PSA-type liquid crystal display device is being continuously developed, and the PSA principle is also being used in diverse classical liquid crystal displays, such as the known PSA-VA, PSA-OCB, PSA-IPS, PSA-FFS, and PSA-TN displays. In a PSA liquid crystal display, the liquid crystal composition containing the polymerizable compound(s) is contained between two substrates. Each substrate is equipped with an electrode structure, or alternatively two electrode structures are provided on only one of the substrates. In addition, one or both substrates may contain an alignment layer which is provided on the substrate or the electrode structure (if present) such that it is in contact with the liquid crystal composition, to induce initial alignment of the liquid crystal composition. Like the conventional liquid crystal displays, PSA liquid crystal displays can be operated as active-matrix or passive-matrix displays. In the case of active-matrix displays, individual pixels are usually addressed by integrated, non-linear active elements, such as transistors, while in the case of passive-matrix displays, individual pixels are usually addressed by the multiplex method, as known from the prior art.

After filling the liquid crystal composition into the display device, the polymerizable compounds contained in the liquid crystal composition are polymerized or crosslinked in situ, usually by UV photopolymerisation, which is achieved by exposing the liquid crystal composition to UV radiation, preferably while a voltage is applied to the electrode structures. As a result of UV exposure, the polymerized or crosslinked polymerizable compounds phase-separate from other compounds in the liquid crystal composition and form a polymer layer on the substrate surfaces, where they induce a pretilt angle of the liquid crystal molecules relative to the substrates. Polymerization of the polymerizable compounds preferably takes place with an applied voltage in case of PSA-VA, PSA-OCB, PSA-FFS and PSA-TN liquid crystal displays, and with or without, preferably without, an applied voltage in case of PSA-IPS liquid crystal displays.

Usually UV photopolymerisation in the PSA liquid crystal display production process is carried out in two steps. In a first step, hereinafter also referred to as "UV1 step", the liquid crystal composition is exposed to UV radiation emitted by a radiation source (hereinafter also referred to as "light source"), while applying a voltage to the electrode structures, to generate a pretilt angle. In a second step, hereinafter also referred to as "UV2 step", the liquid crystal composition is exposed to UV irradiation without a voltage, in order to ensure complete polymerization of any residual polymerizable compounds that did not polymerize in UV1 step. As described above, a complete polymerization is important because residual unreacted polymerizable compounds may lead to undesired effects like reduced reliability, reduced tilt angle stability or image sticking in the display. Also, it is important to ensure that the polymerization in UV2 step is completed in an acceptable time, so that the tact time is preferably clearly shorter than 2 h. Also, the UV radiation intensity in UV2 step should be reduced compared to UV1 step, to avoid or reduce negative effects like reduced reliability or image sticking.

However, there are some display defects such as image sticking in PSA-type liquid crystal display device. Studies have shown that such problems are mostly caused by the presence of impurities and changes in the alignment of liquid crystal molecules (changes in the pretilt angle), and the alignment of liquid crystal molecules is controlled by a polymer network formed by the polymerization of polymerizable compounds. If the structural rigidity of the polymerizable compounds constituting the polymer network is insufficient, the structure of the polymer network may change when the PSA-type liquid crystal display device continuously displays the same pattern for a long time, thereby causing the changes in the pretilt angle of liquid crystal molecules. Therefore, it is generally necessary to select a polymerizable compound having a rigid structure.

In the prior art, polymerizable compounds of the following formulae (a) and (b) are widely used:

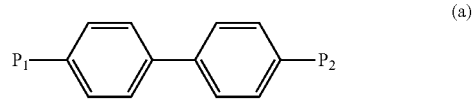

(a)

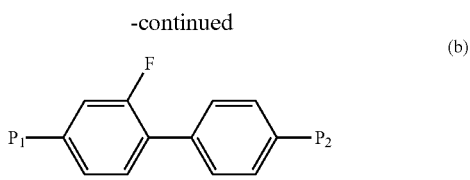
(b)

in which, P1 and P2 represent polymerizable group, usually an acrylate or methacrylate group.

However, with the development of technology, the liquid crystal display industry has more stringent requirements for the display quality of liquid crystal display, especially in the TV industry, with the general increase of the size of TVs, the LCD generation line has been increased. The difficulty of manufacturing the large-size LCD panels has also been significantly increased. Therefore, how to ensure the display quality is an urgent problem to be solved. In addition to continuously optimizing the panel manufacturing process, the continuous development of liquid crystal materials is also one of the solutions. Especially for PSA liquid crystal displays, improving the performances in various aspects of polymerizable compounds is a hot spot of the research.

Preferred polymerizable compounds are those which, compared to existing reactive monomers (RMs), can generate a lower pretilt angle after the same exposure time, or can generate the same pretilt angle after a shorter exposure time. The use of such preferred polymerizable compounds can reduce the display production time, improve manufacturing efficiency and reduce production costs.

Currently, common problems in the production of PSA liquid crystal displays are the presence and removal of residual amounts of unpolymerized compounds as well as the stability of pretilt angle. After the generation of the pretilt angle in PSA liquid crystal displays through polymerization of polymerizable compounds with UV1 and UV2 steps, a small amount of unreacted polymerizable compounds may adversely affect the properties of the display by polymerizing in an uncontrolled manner after the display has been manufactured. For example, uncontrolled polymerization of the residual polymerizable compounds is initiated by UV light from the environment or the backlight. In the addressed display areas, this changes the pretilt angle after a number of addressing cycles. As a result, a change in transmission in the addressed areas may occur, while the pretilt angle and transmission remain unchanged in the non-addressed areas, thus causing image sticking effect. During the production of the PSA liquid crystal display, it is therefore desirable that polymerization of the polymerizable compounds proceeds as completely as possible. In addition, a controlled reaction of the residual polymerizable compounds is desirable. These expectations are more conducive to be achieved if the polymerization rate is faster. In addition, it is also desirable that the change in pretilt angle is small after a plurality of addressing cycles.

A further important index problem that has been observed in the operation of PSA liquid crystal displays is the stability of the pretilt angle. If the generated pretilt angle is not stable, it will change significantly during the use of display. This will cause problems, such as uneven display and gamma shift. The greater the change of pretilt angle, the more serious the uneven display of the PAS liquid crystal display.

Another common problem of PSA liquid crystal displays is easy occurrence of "Zara Particle", which is caused by the excessively large polymer particles formed during the polymerization of the polymerizable compounds. In addition, the uneven particle sizes of the polymer lead to the uneven polymer distribution, which in turn causes the problem of uneven display. Therefore, it is desirable that the polymerizable compounds can form polymer particles with small size and uniform distribution, so as to improve the problems, such as "Zara Particle" and uneven display.

In another aspect, voltage holding ration (VHR) is also an important parameter for the reliability of the polymerizable liquid crystal compositions for use in PSA liquid crystal displays. The polymerizable liquid crystal composition should have a higher VHR value, so as to reduce the occurrences of problems, such as "burn-in" and electrical voltage fluctuation, of the liquid crystal displays. Existing liquid crystal display devices are often exposed to ultraviolet rays in various environments. In PSA liquid crystal displays, the polymerizable liquid crystal compositions inevitably needs to have higher VHR values after irradiation with UV light, because UV exposure does not only occur as normal exposure during operation of the finished display, but is also a necessary part of the display production process.

In addition, the polymerizable compounds of prior art do often have high melting points, and do only show limited solubility in many commonly used liquid crystal compositions, and therefore frequently tend to spontaneously crystallise out of the liquid crystal compositions. In addition, the solubility of the polymerizable compound in liquid crystal compositions is further aggravated by the risk of spontaneous polymerization thereof. Therefore, the liquid crystal composition in which polymerizable compounds are dissolved are usually introduced in the display at low temperatures in order to reduce the risk of spontaneous polymerization. This puts higher requirements on the solubility of the polymerizable compound in the liquid crystal composition, especially the solubility at low temperature.

Therefore, it is expected to develop a liquid crystal composition that can satisfy the above requirements simultaneously or at least one of the above requirements.

SUMMARY OF THE INVENTION

In view of the defects of existing technologies, one objective of the present invention is to provide a liquid crystal composition containing polymerizable compound(s), which has a higher VHR (both the initial VHR and the VHR after UV irradiation), a lower surface roughness of the polymer layer, a lower residual amount of polymerizable compound(s), a faster polymerization rate and a better pretilt angle stability.

Another objective of the present invention is to provide a liquid crystal display device comprising the liquid crystal composition of the present invention.

In order to achieve the above objectives, the present invention provides a liquid crystal composition containing polymerizable compound(s), which comprises:

at least one compound of general Formula I

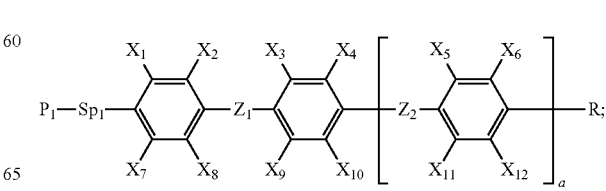

at least one compound of general Formula II

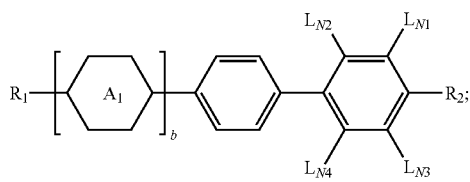

and
at least one compound of general Formula M

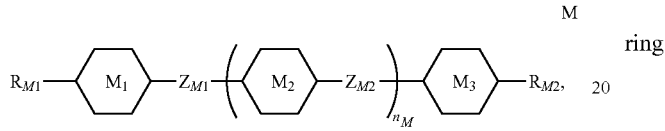

in which,

R and $X_1$-$X_{12}$ each independently represents —H, halogen, —CN, -$Sp_2$-$P_2$ or $C_{1-12}$ linear, branched or cyclic alkyl, wherein one or more nonadjacent —$CH_2$— in the $C_{1-12}$ linear, branched or cyclic alkyl can each be independently replaced by —CH=CH—, —C≡C—, —O—, —CO—, —CO—O— or —O—CO—, and one or more —H in the $C_{1-12}$ linear, branched or cyclic alkyl can each be independently substituted by —F or —Cl, wherein at least one of $X_1$-$X_{12}$ represents —Cl;

$P_1$ and $P_2$ each independently represents a polymerizable group;

$Sp_1$ and $Sp_2$ each independently represents spacer group or single bond;

$R_1$, $R_2$, $R_{M1}$ and $R_{M2}$ each independently represents $C_{1-12}$ linear or branched alkyl,

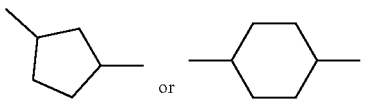

wherein one or more nonadjacent —$CH_2$— in the $C_{1-12}$ linear or branched alkyl can each be independently replaced by —CH=CH—, —C≡C—, —O—, —CO—, —CO—O— or —O—CO—;

ring

represents

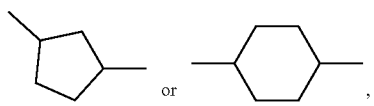

wherein one or more —$CH_2$— in

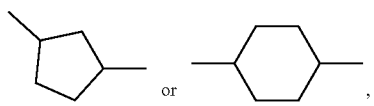

can be replaced by —O—, and one or more single bonds in the ring can be replaced by double bond;

ring

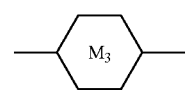

ring

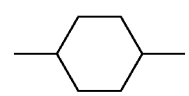

and ring

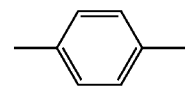

each independently represents

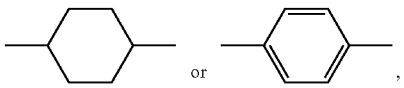

wherein one or more —$CH_2$— in

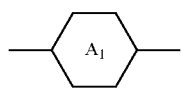

can be replaced by —O—, and one or more single bonds in the ring can be replaced by double bond; at most one —H on

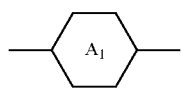

can be substituted by halogen;

$Z_1$ and $Z_2$ each independently represents —O—, —S—, —CO—, —CO—O—, —O—CO—, —O—CO—O—, —$CH_2$O—, —O$CH_2$—, —$CH_2$S—, —S$CH_2$—, —$CF_2$O—, —O$CF_2$—, —$CF_2$S—, —S$CF_2$—, —($CH_2$)$_n$—, —$CF_2CH_2$—, —$CH_2CF_2$—, —($CF_2$)$_n$—, —CH=CH—, —CF=CF—, —CH=CF—, —CF=CH—, —C≡C—, —CH=CH—CO—O—, —O—CO—CH=CH—, —$CH_2CH_2$—CO—O—, —O—CO—$CH_2CH_2$—, —$CR^1R^2$— or single bond, wherein $R^1$ and $R^2$ each independently represents —H or $C_{1-12}$ linear or branched alkyl, and n represents a integer from 1 to 4;

$Z_{M1}$ and $Z_{M2}$ each independently represents single bond, —CO—O—, —O—CO—, —CH$_2$O—, —OCH$_2$—, —C≡C—, —CH=CH— —CH$_2$CH$_2$— or —(CH$_2$)$_4$—;

$L_{N1}$ and $L_{N2}$ each independently represents —F or —Cl;

$L_{N3}$ and $L_{N4}$ each independently represents —H, C$_{1-3}$ alkyl or halogen;

a represents 0, 1 or 2, and when a=2, ring

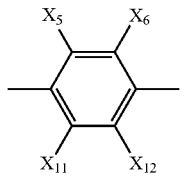

can be same or different, $Z_2$ can be same or different;

b represents 0, 1 or 2, when b=2, ring

can be same or different; and $n_M$ represents 0, 1, 2 or 3, when $n_M$=2, ring

can be same or different, $Z_{M2}$ can be same or different.

In some embodiments of the present invention, R preferably represents -Sp$_2$-P$_2$.

In some embodiments of the present invention, a is preferably 0 or 1.

In some embodiments of the present invention, the liquid crystal composition preferably comprises one polymerizable compound of general Formula I wherein a=0 and one polymerizable compound of general Formula I wherein a=1.

In some embodiments of the present invention, the compound of general Formula I is selected from a group consisting of the following compounds:

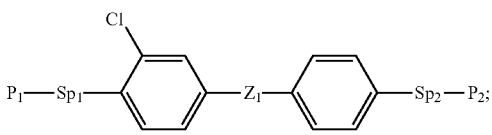
I-1

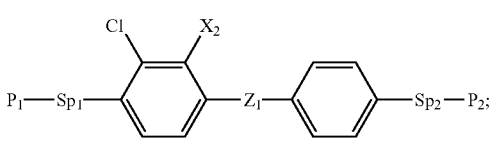
I-2

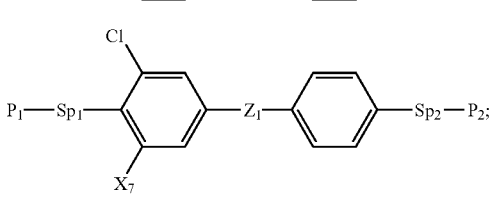
I-3

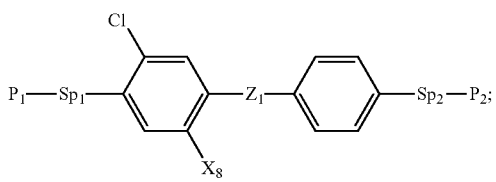
I-4

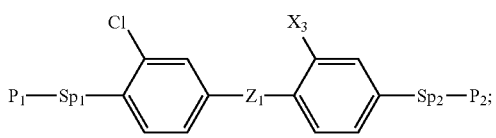
I-5

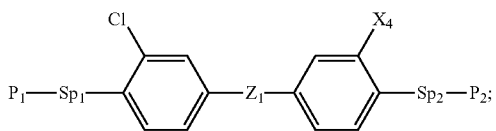
I-6

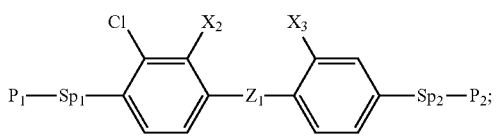
I-7

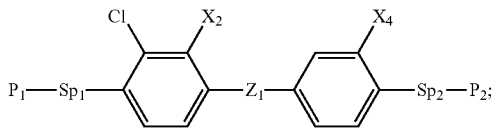
I-8

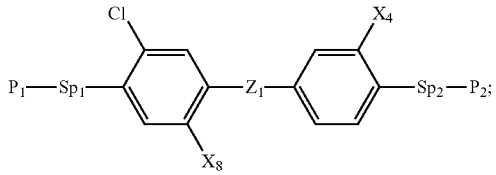
I-9

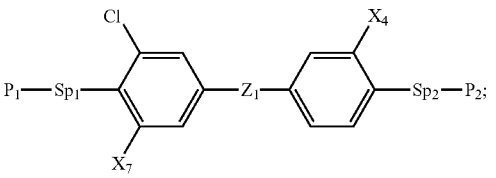
I-10

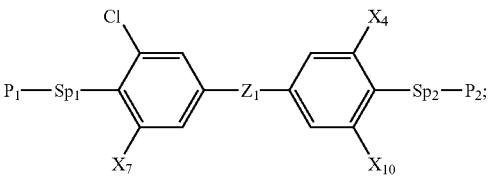
I-11

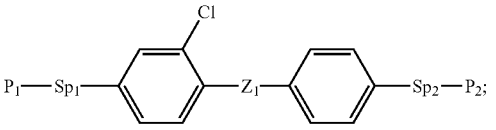
I-12

I-13
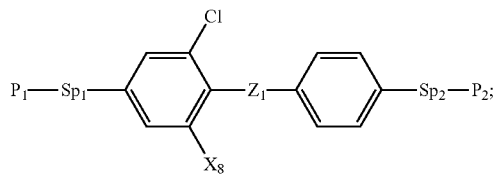
I-14
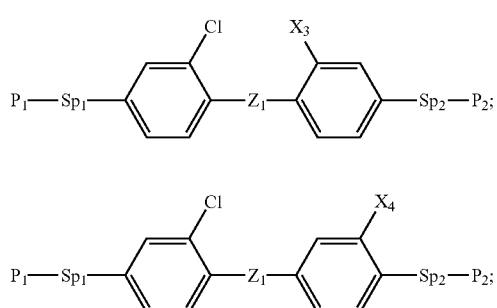
I-15
I-16
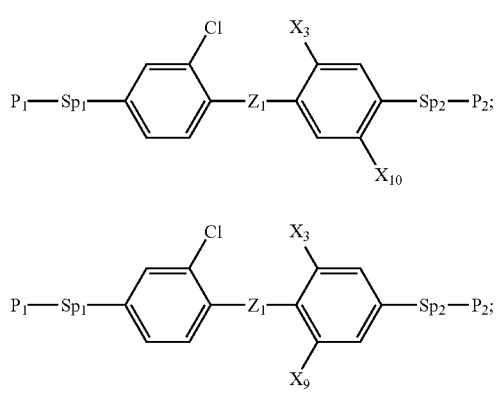
I-17
I-18
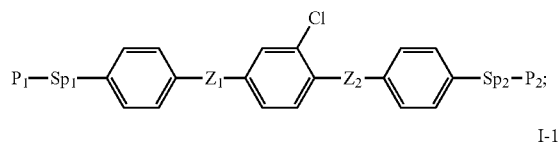
I-19
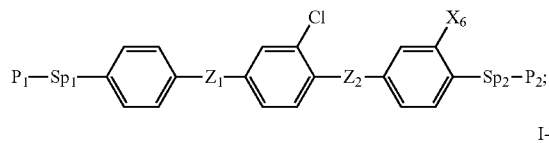
I-20
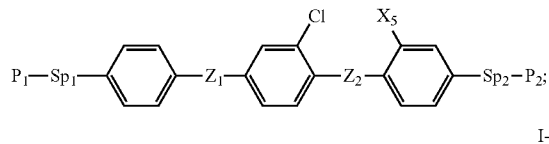
I-21
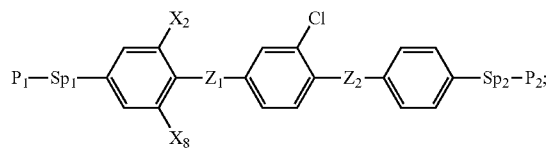
I-22
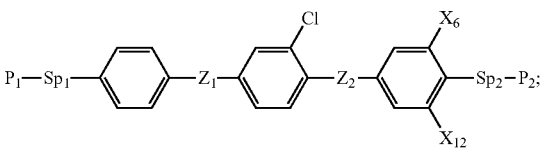
I-23
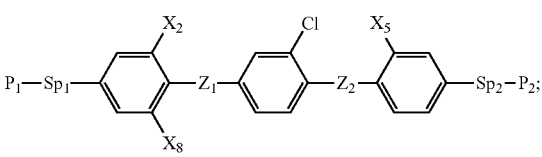
I-24
I-25
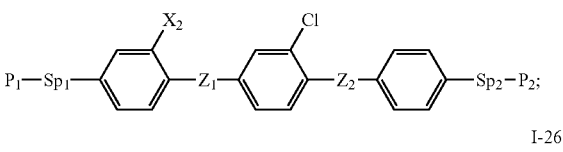
I-26
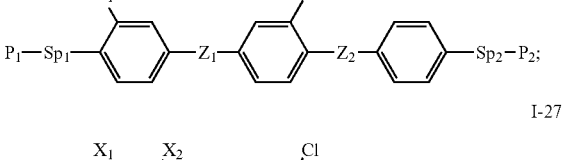
I-27
I-28
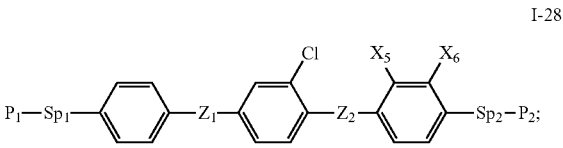
I-29
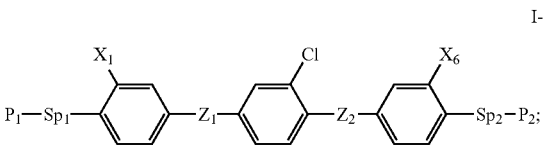
I-30
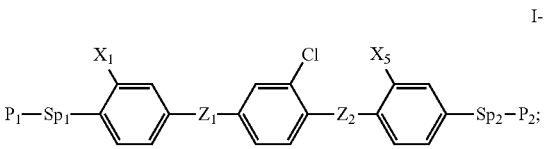
I-31
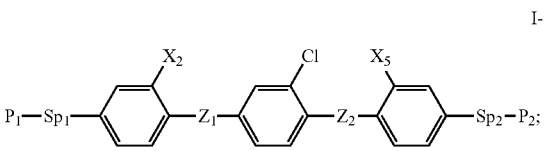

-continued

I-32
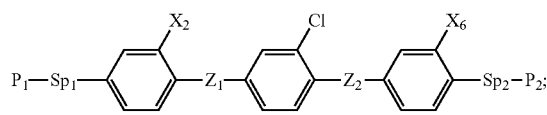

I-33
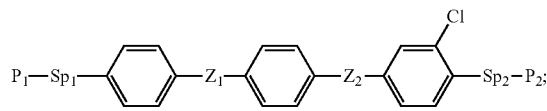

I-34
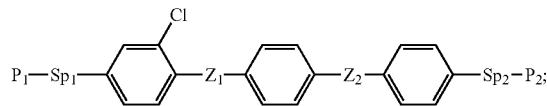

I-35
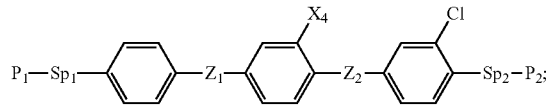

I-36
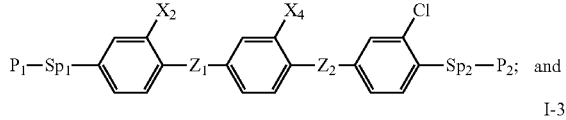

and

I-37
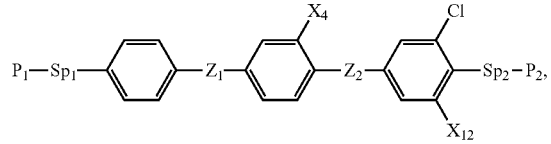

in which, $X_1$-$X_{12}$ each independently represents —F, —Cl, -$Sp_2$-$P_2$, or $C_{1-5}$ linear, branched or cyclic alkyl or alkoxy.

In some embodiments of the present invention, preferably, at least one of $Z_1$ and $Z_2$ represents single bond; further preferably, both $Z_1$ and $Z_2$ represent single bond.

In some embodiments of the present invention, the lower limit of the weight percentage of the compound of general Formula I is 0.001%, 0.005%, 0.01%, 0.04%, 0.08%, 0.1%, 0.2%, 0.25%, 0.28%, 0.29%, 0.3%, 0.32%, 0.33%, 0.35%, 0.5%, 0.8%, 1%, 1.5%, 2%, 2.5%, 3% or 3.5%, relative to the total weight of the liquid crystal composition of the present invention; the upper limit of the weight percentage of the compound of general Formula I is 5%, 4%, 3.5%, 3%, 2.5%, 2%, 1.5%, 1%, 0.8%, 0.5%, 0.35%, 0.33%, 0.32%, 0.3%, 0.29%, 0.28%, 0.25%, 0.2%, 0.15% or 0.1%, relative to the total weight of the liquid crystal composition of the present invention.

In some embodiments of the present invention, the compound of general Formula I provides 0.001%-5% by weight of the total weight of the liquid crystal composition, preferably 0.01%-2% by weight of the total weight of the liquid crystal composition, and more preferably 0.01%-1% by weight of the total weight of the liquid crystal composition.

The polymerizable groups involved in the present invention are groups suitable for polymerization reactions (for example, radical or ionic bond polymerization, addition polymerization or condensation polymerization), or groups suitable for addition or condensation on the polymer backbone. For chain polymerization, a polymerizable group containing —C═C— or —C≡C— is particularly preferred, and for ring-opening polymerization, for example, an oxetane or epoxy group is particularly preferred.

In some embodiments of the present invention, $P_1$ and $P_2$ each independently represents

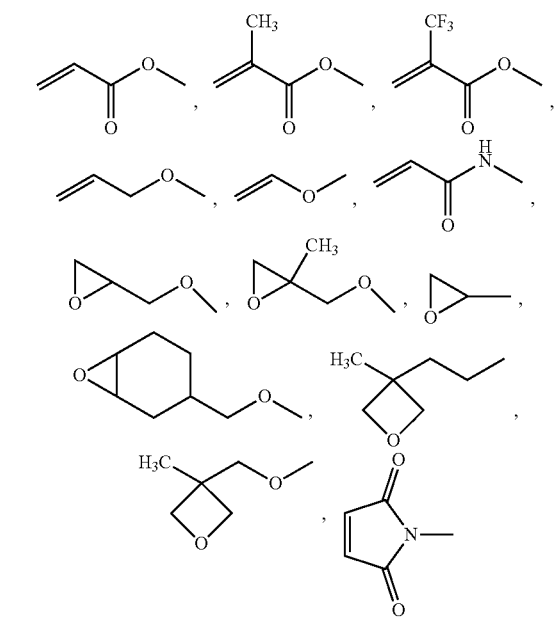

or —SH; preferably, $P_1$ and $P_2$ each independently represents or —SH; more preferably, $P_1$ and $P_2$ each independently represents The term "spacer group" as used herein, is known to the person skilled in the art and is described in the literature, see, for example, Pure Appl. Chem. 2001, 73(5), 888 and C. Tschierske, G. Pelzl, S. Diele, Angew. Chem. 2004, 1 16, 6340-6368. As used herein, the term "spacer group" means a flexible group which connects the mesogenic group and the polymerizable group(s) in a polymerizable compound. Representative spacer group for example includes —$(CH_2)p_1$—, —$(CH_2CH_2O)q_1$-$CH_2CH_2$—, —$(CH_2CH_2S)q_1$-$CH_2CH_2$—, —$(CH_2CH_2NH)q_1$-$CH_2CH_2$—, —$CR^OR^{OO}$—$(CH_2)_{p1}$— or —$(SiR^OR^{OO}$—$O)p_1$-, wherein $p_1$ represents a integer from 1 to 12, $q_1$ represents a integer from 1 to 3, $R^O$ and $R^{OO}$ each independently represents —H or $C_{1-12}$ linear, branched or cyclic alkyl. The spacer group is preferably —$(CH_2)p_1$-, —$(CH_2)p_1$-O—, —$(CH_2)p_1$-O—CO—, —$(CH_2)p_1$-CO—O—, —$(CH_2)p_1$-O—CO—O— or —$CR^OR^{OO}$—$(CH_2)p_1$-.

In some embodiments of the present invention, the lower limit of the weight percentage of the compound of general Formula II is 1%, 2%, 4%, 5%, 5.5%, 6%, 8%, 10%, 12%, 14%, 16%, 18%, 20%, 21.5%, 22%, 24%, 26%, 28%, 30%, 35%, 40% or 45%, relative to the total weight of the liquid crystal composition of the present invention; the upper limit of the weight percentage of the compound of general Formula II is 45%, 44%, 42%, 40%, 38%, 36%, 34%, 32%, 30%, 28%, 26%, 24%, 22%, 21.5%, 20%, 18%, 16% or 15%, relative to the total weight of the liquid crystal composition of the present invention.

In some embodiments of the present invention, the compound of general Formula II provides 1%-45% by weight of the total weight of the liquid crystal composition, preferably 5%-45% by weight of the total weight of the liquid crystal composition, and more preferably 5%-35% by weight of the total weight of the liquid crystal composition.

In some embodiments of the present invention, the compound of general Formula II is selected from a group consisting of the following compounds:

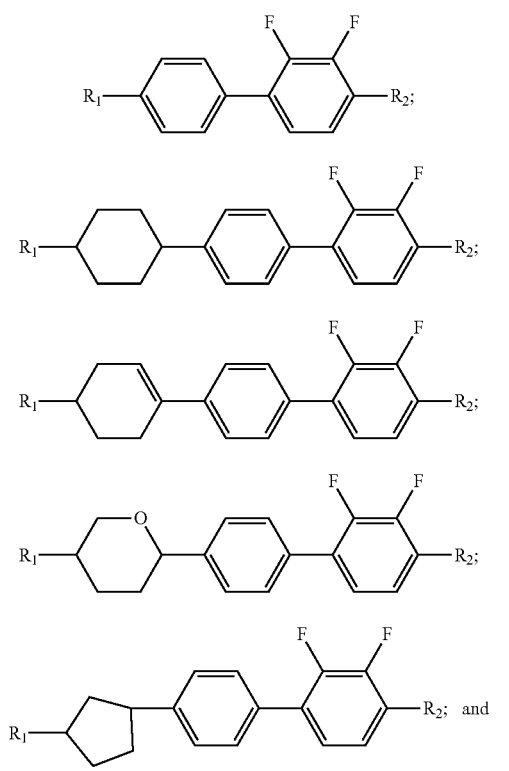

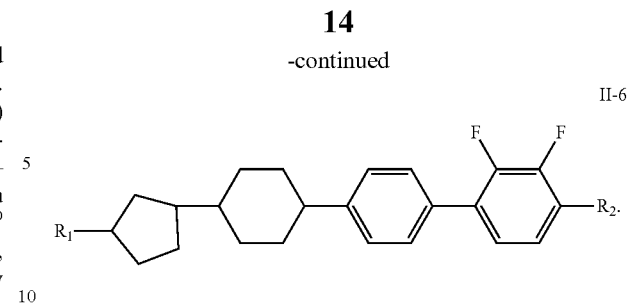

In some embodiments of the present invention, preferably, $R_1$ and $R_2$ each independently represents $C_{1-10}$ linear or branched alkyl, $C_{1-9}$ linear or branched alkoxy, or $C_{2-10}$ linear or branched alkenyl, further preferably $C_{1-8}$ linear or branched alkyl, $C_{1-7}$ linear or branched alkoxy, or $C_{2-8}$ linear or branched alkenyl; still further preferably $C_{1-5}$ linear or branched alkyl, $C_{1-4}$ linear or branched alkoxy, or $C_{2-5}$ linear or branched alkenyl.

In some embodiments of the present invention, the compound of general Formula M is selected from a group consisting of the following compounds:

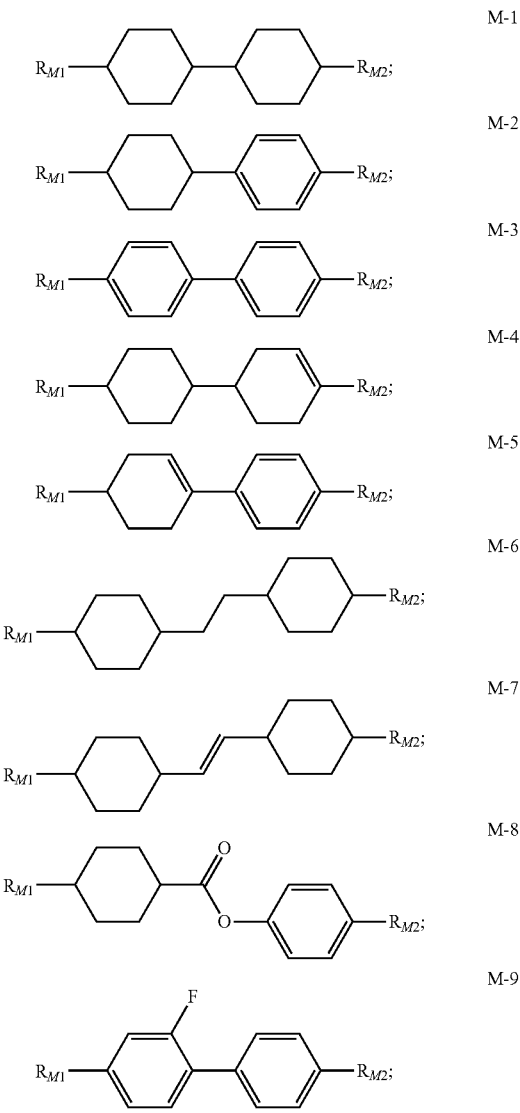

-continued

M-10
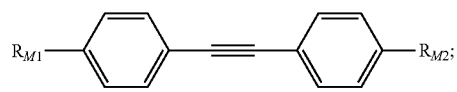

M-11
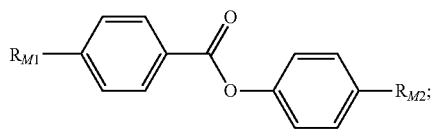

M-12
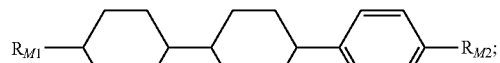

M-13
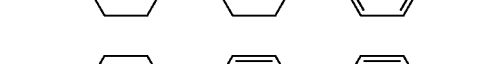

M-14
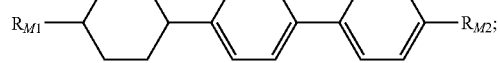

M-15
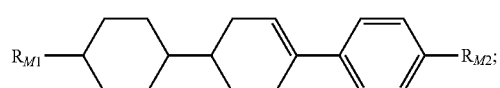

M-16
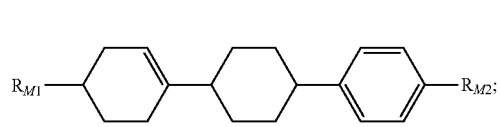

M-17
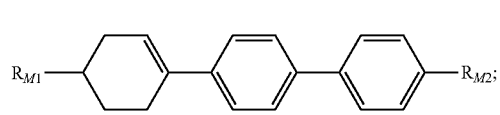

M-18
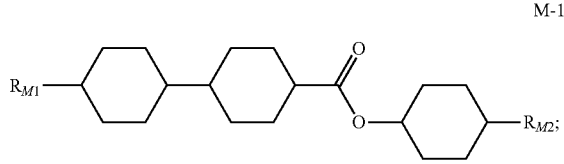

M-19
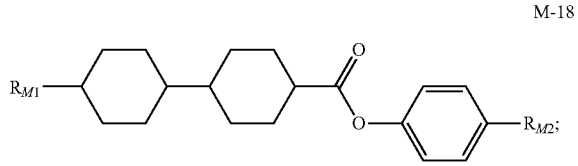

M-20
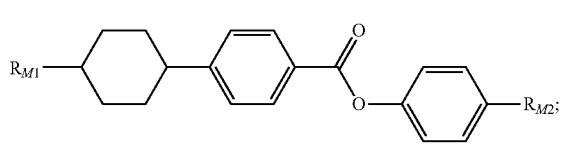

M-21
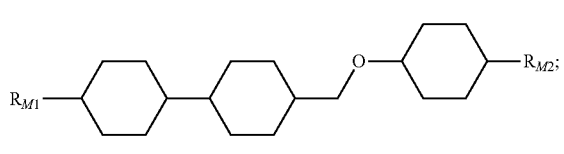

M-22
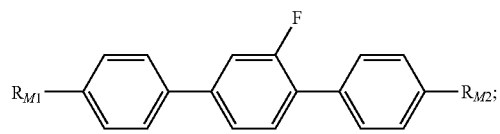

M-23
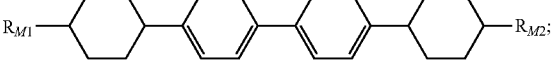

M-24
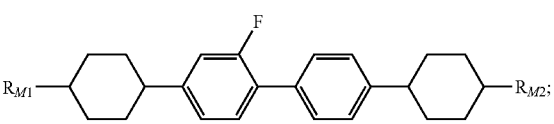

M-25

and

M-26
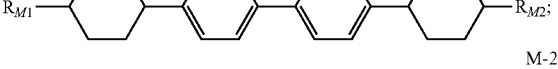

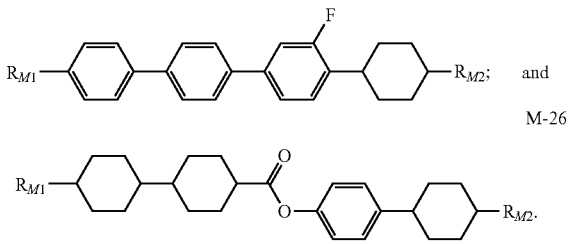

In some embodiments of the present invention, the lower limit of the weight percentage of the compound of general Formula M is 1%, 2%, 4%, 6%, 8%, 10%, 15%, 20%, 22%, 24%, 26%, 28%, 30%, 35%, 38.5%, 40%, 45% or 50%, relative to the total weight of the liquid crystal composition of the present invention; the upper limit of the weight percentage of the compound of general Formula M is 80%, 75%, 70%, 65%, 60%, 58%, 56%, 55.5%, 54%, 52%, 50%, 45%, 40%, 38.5%, 35%, 30%, 28%, 25.5%, 25%, 24%, 22% or 20%, relative to the total weight of the liquid crystal composition of the present invention.

In some embodiments of the present invention, the compound of general Formula M provides 1%-80% by weight of the total weight of the liquid crystal composition, preferably 20%-60% by weight of the total weight of the liquid crystal composition, and more preferably 30%-50% by weight of the total weight of the liquid crystal composition.

In some embodiments of the present invention, the lower limit and the upper limit of the content of the compound of general Formula M are preferably higher when it is desired to maintain the liquid crystal composition of the present invention with a lower viscosity and a shorter response time. Further, the lower limit and the upper limit of the content of the compound of general Formula M are preferably higher when it is desired to maintain the liquid crystal composition of the present invention with a higher clearing point and a good temperature stability. In addition, the lower limit and the upper limit of the content of the compound of general Formula M are preferably decreased in order to maintain the driving voltage lower and make the absolute value of the dielectric anisotropy larger.

In some embodiments of the present invention, preferably, $R_{M1}$ and $R_{M2}$ each independently represents $C_{1-10}$ linear or branched alkyl, $C_{1-9}$ linear or branched alkoxy, or $C_{2-10}$ linear or branched alkenyl; further preferably $C_{1-8}$ linear or branched alkyl, $C_{1-7}$ linear or branched alkoxy, or $C_{2-8}$ linear or branched alkenyl; still further preferably $C_{1-5}$ linear or branched alkyl, $C_{1-4}$ linear or branched alkoxy, or $C_{2-5}$ linear or branched alkenyl.

In some embodiments of the present invention, preferably, $R_{M1}$ and $R_{M2}$ each independently represents $C_{2-8}$ linear alkenyl; further preferably $C_{2-5}$ linear alkenyl.

In some embodiments of the present invention, preferably, one of $R_{M1}$ and $R_{M2}$ is $C_{2-5}$ linear alkenyl, while the other is $C_{1-5}$ linear alkyl.

In some embodiments of the present invention, preferably, $R_{M1}$ and $R_{M2}$ each independently represents $C_{1-8}$ linear alkyl, or $C_{1-7}$ linear alkoxy; further preferably, $C_{1-5}$ linear alkyl, or $C_{1-4}$ linear alkoxy.

In some embodiments of the present invention, preferably, one of $R_{M1}$ and $R_{M2}$ is $C_{1-5}$ linear alkyl, while the other is $C_{1-5}$ linear alkyl, or $C_{1-4}$ linear alkoxy; further preferably, both $R_{M1}$ and $R_{M2}$ are each independently $C_{1-5}$ linear alkyl.

With emphasis in reliability, both $R_{M1}$ and $R_{M2}$ are preferably each independently alkyl; with emphasis in reducing the volatility of the compound, both $R_{M1}$ and $R_{M2}$ are preferably each independently alkoxy; and with emphasis in reducing the viscosity, at least one of $R_{M1}$ and $R_{M2}$ is preferably alkenyl.

The alkenyl group in the present invention is preferably selected from the groups represented by any one of formula (V1) to formula (V9), particularly formula (V1), formula (V2), formula (V8) or formula (V9). The groups represented by formula (V1) to formula (V9) are as follows:

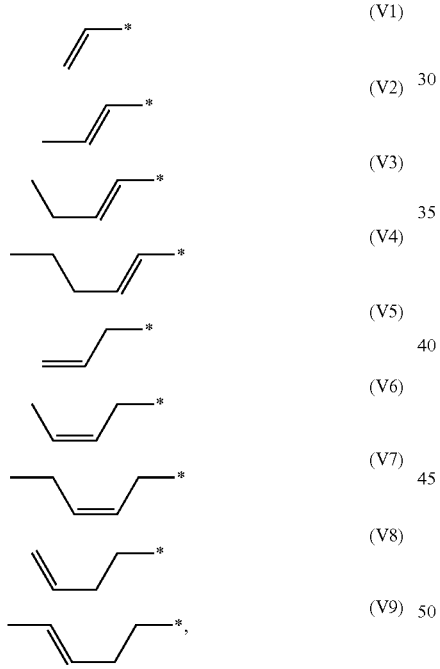

in which, * represents bound carbon atom in the ring structure.

The alkenoxy group in the present invention is preferably selected from the groups represented by any one of formula (OV1) to formula (OV9), particularly formula (OV1), formula (OV2), formula (OV8) or formula (OV9). The groups represented by formula (OV1) to formula (OV9) are as follows:

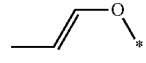 (OV1)

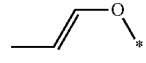 (OV2)

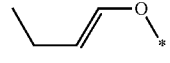 (OV3)

 (OV4)

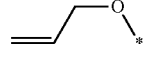 (OV5)

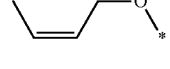 (OV6)

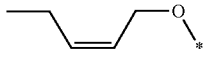 (OV7)

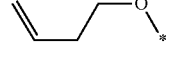 (OV8)

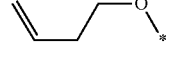 (OV9)

in which, * represents bound carbon atom in the ring structure.

In some embodiments of the present invention, the liquid crystal composition further comprises at least one compound of general Formula III and at least one compound of general Formula IV:

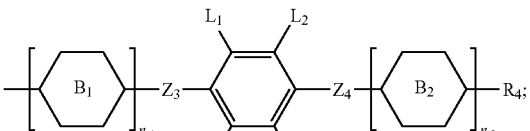  III

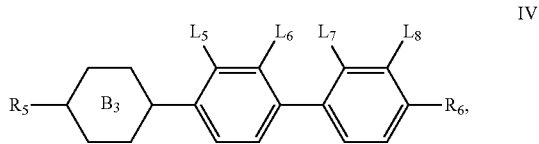  IV in which, $R_3$, $R_4$, $R_5$ and $R_6$ each independently represents $C_{1-12}$ linear or branched alkyl,

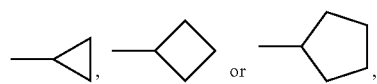

wherein one or more nonadjacent —CH$_2$— in the C$_{1-12}$ linear or branched alkyl can each be independently replaced by —CH=CH—, —C≡C—, —O—, —CO—, —CO—O— or —O—CO—;

ring

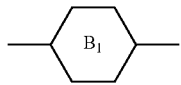

and ring

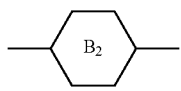

each independently represents

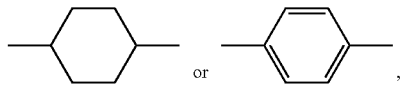

wherein one or more —CH$_2$— in

can be replaced by —O—, and one or more single bonds in the ring can be replaced by double bond; one or more —H on

can be substituted by —F, —Cl or —CN, and one or more —CH= in the ring can be replaced by —N=;

ring

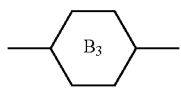

represents

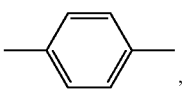

wherein one or more —H on

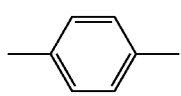

can be substituted by —F, —Cl or —CN, and one or more —CH= in the ring can be replaced by —N=;

L$_1$ and L$_2$ each independently represents —F or —Cl;

L$_3$ and L$_4$ each independently represents —H, C$_{1-3}$ alkyl or halogen;

L$_5$, L$_6$, L$_7$ and L$_8$ each independently represents —H, —F or —Cl, wherein at least two of L$_5$, L$_6$, L$_7$ and L$_8$ represents —F or —Cl, and when only two of L$_5$, L$_6$, L$_7$ and L$_8$ represents —F or —Cl, —F and —Cl are on the same benzene ring;

Z$_3$ and Z$_4$ each independently represents single bond, —CO—O—, —O—CO—, —CH$_2$O—, —OCH$_2$—, CH=CH—, —C≡C—, —CH$_2$CH$_2$—, —CF$_2$CF$_2$—, —(CH$_2$)$_4$—, —CF$_2$O— or —OCF$_2$—, wherein ring

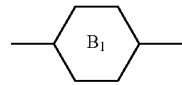

is non-aromatic ring when Z$_3$ represents single bond;

n$_1$ represents 1 or 2, and when n$_1$=2, ring

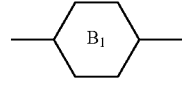

can be same or different; and n$_2$ represents 0 or 1.

In some embodiments of the present invention, the lower limit of the weight percentage of the compound of general Formula III is 1%, 2%, 4%, 6%, 8%, 10%, 15%, 16%, 18%, 20%, 22%, 24%, 26%, 28%, 28.5%, 30%, 34%, 36%, 38%, 39.5% or 40%, relative to the total weight of the liquid crystal composition of the present invention; the upper limit of the weight percentage of the compound of general Formula III is 50%, 48%, 46%, 44%, 42%, 40%, 39.5%, 38%, 36%, 34%, 32%, 30%, 28.5%, 28%, 26%, 24%, 22% or 20%, relative to the total weight of the liquid crystal composition of the present invention.

In some embodiments of the present invention, the compound of general Formula III provides 1%-50% by weight of the total weight of the liquid crystal composition, preferably 15%-50% by weight of the total weight of the liquid crystal composition, and more preferably 20%-45% by weight of the total weight of the liquid crystal composition.

In some embodiments of the present invention, the compound of general Formula III is selected from a group consisting of the following compounds:

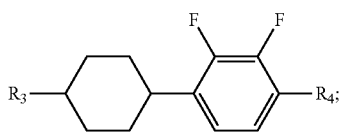

III-1

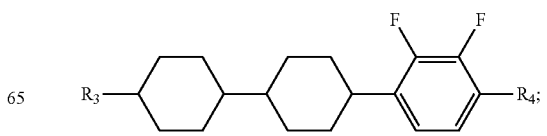

III-2

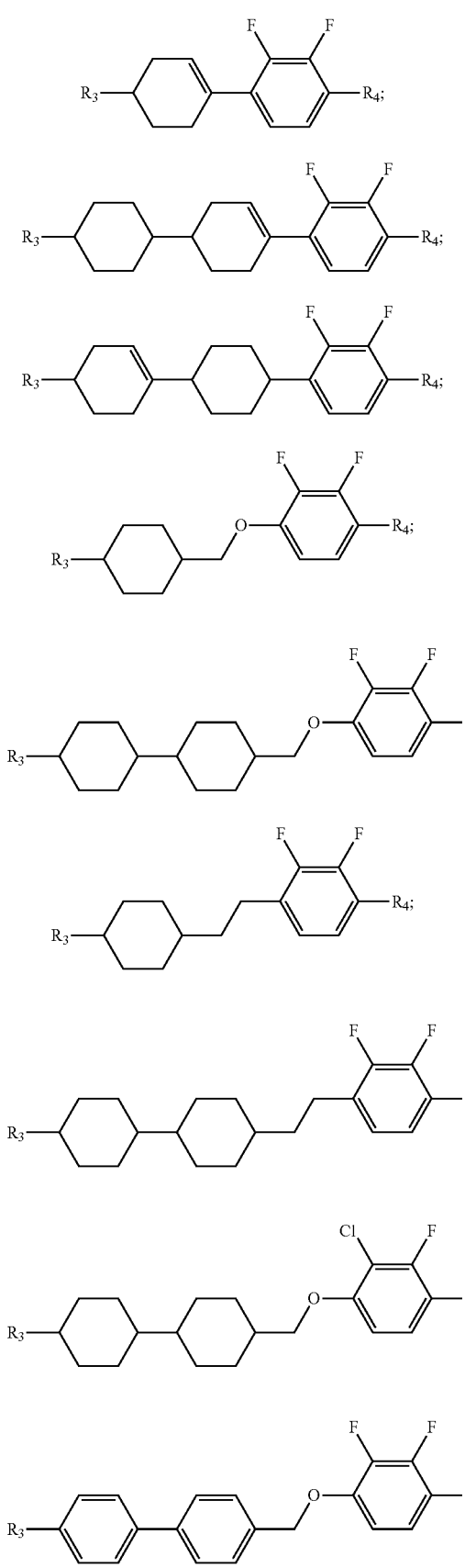
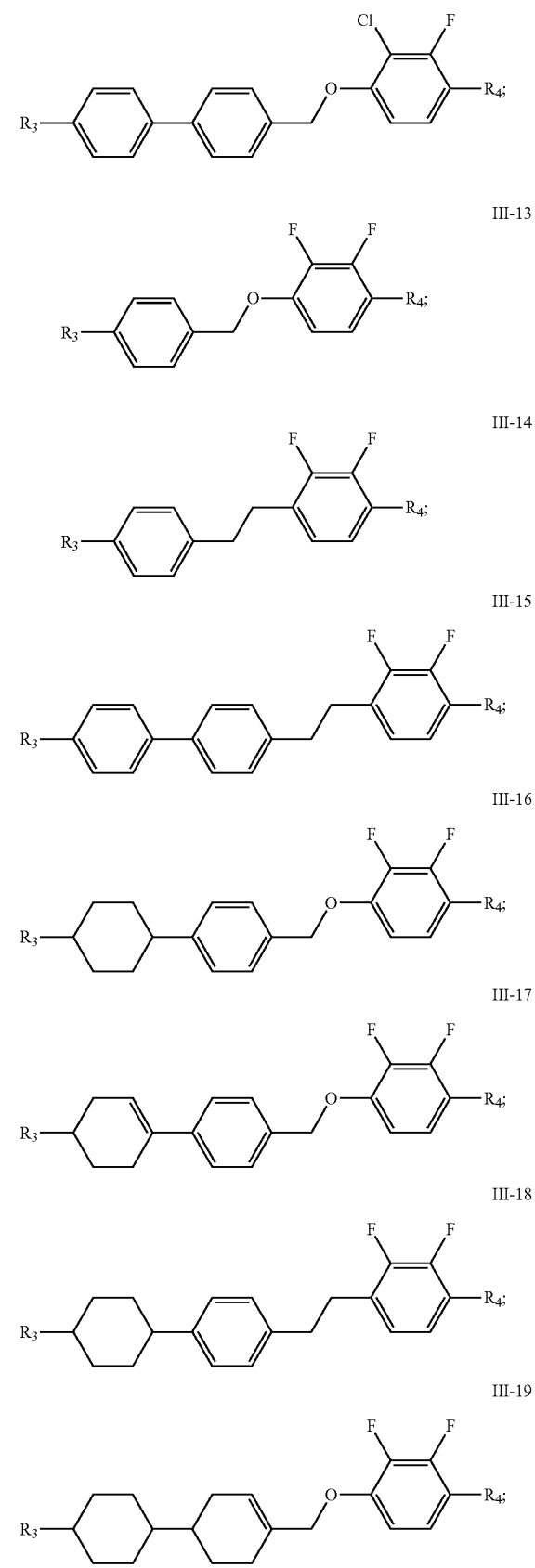

-continued

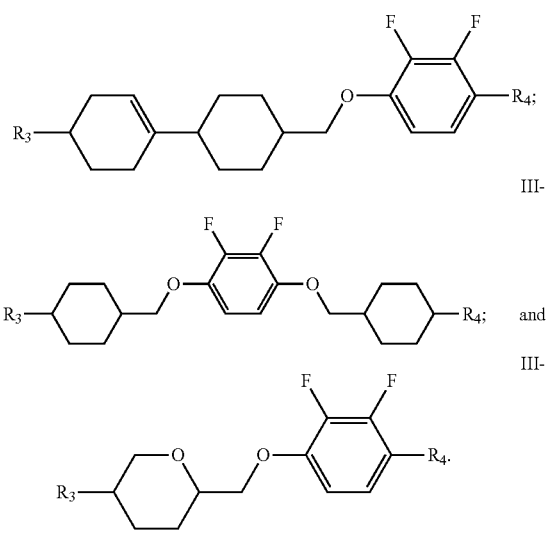

In some embodiments of the present invention, the lower limit of the weight percentage of the compound of general Formula IV is 1%, 2%, 4%, 5%, 6%, 8%, 12%, 14%, 15% or 16%, relative to the total weight of the liquid crystal composition of the present invention; the upper limit of the weight percentage of the compound of general Formula IV is 20%, 18%, 16%, 14%, 12%, 10%, 8%, 6% or 5%, relative to the total weight of the liquid crystal composition of the present invention.

In some embodiments of the present invention, the compound of general Formula IV provides 1%-20% by weight of the total weight of the liquid crystal composition, preferably 1%-15% by weight of the total weight of the liquid crystal composition.

In some embodiments of the present invention, the compound of general Formula IV is selected from a group consisting of the following compounds:

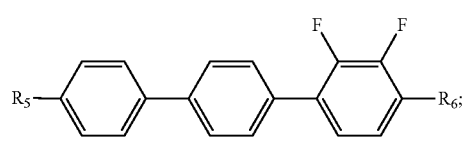

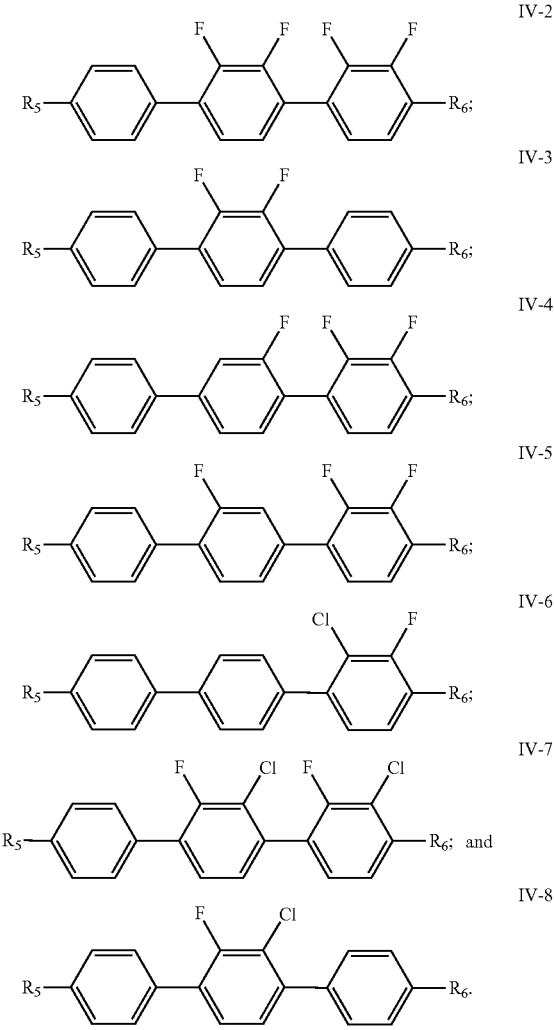

In addition to the above compounds, the liquid crystal composition of the present invention may also contain normal nematic liquid crystal compound, smectic liquid crystal compound, cholesteric liquid crystal compound, dopants, antioxidant, ultraviolet absorber, infrared absorber, polymerizable monomer or light stabilizer, etc.

Dopants which can be preferably added to the liquid crystal composition according to the present invention are shown below.

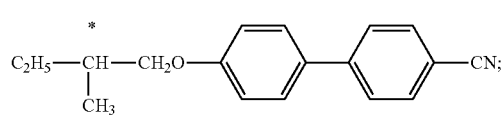

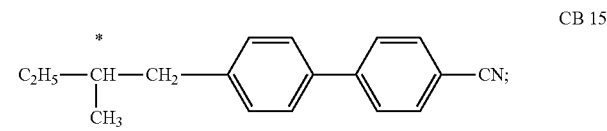

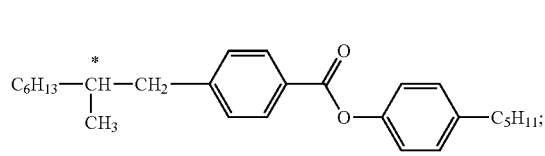

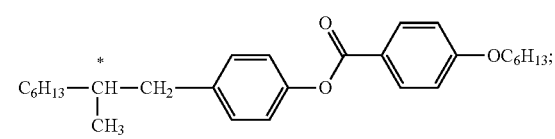

-continued

CM 44
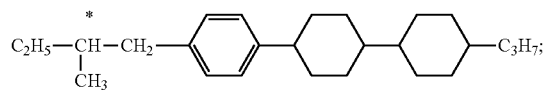

CM 45
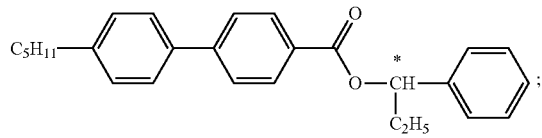

CM 47
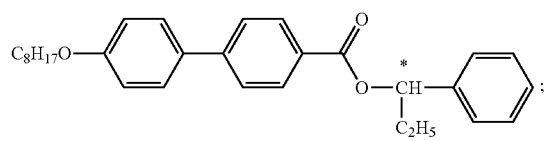

CN
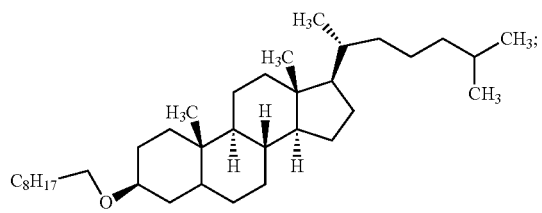

R/S-1011
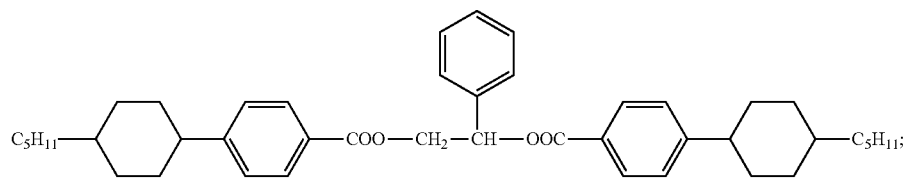

R/S-2011
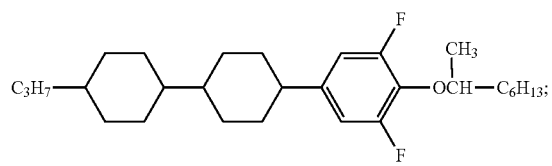

R/S-3011
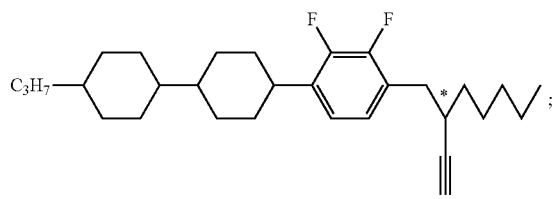

R/S-4011
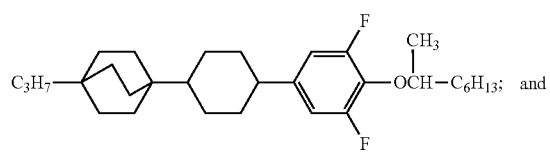

R/S-5011
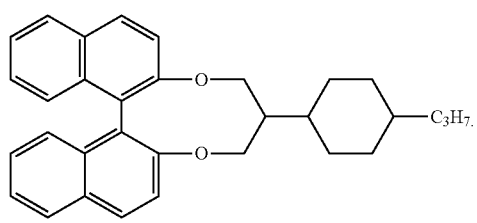

In some embodiments of the present invention, preferably, the dopant provides 0-5% by weight of the total weight of the liquid crystal composition; preferably, 0.01-1% by weight of the total weight of the liquid crystal composition.

Further, additives used in the liquid crystal composition of the present invention, such as antioxidant, light stabilizer and the like, are preferably selected from the following substances.

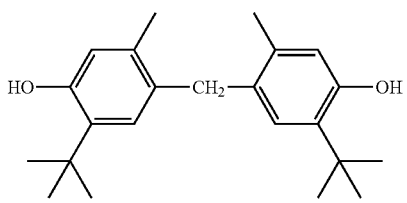
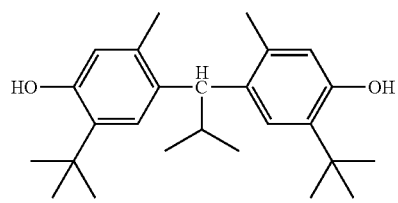

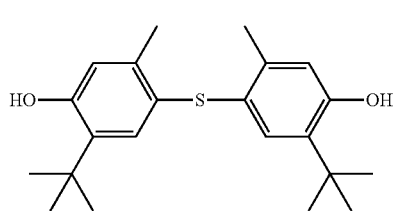
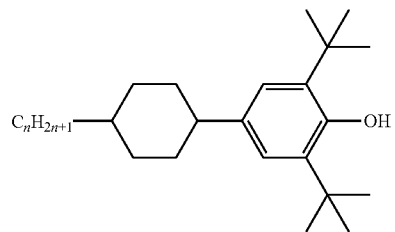
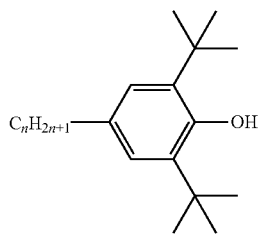
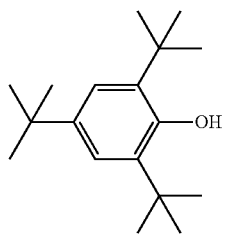
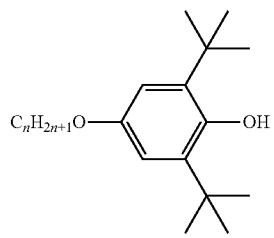
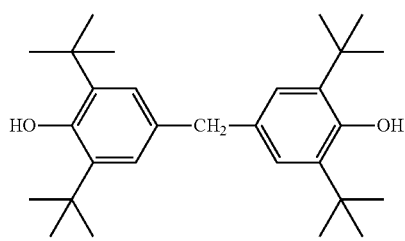
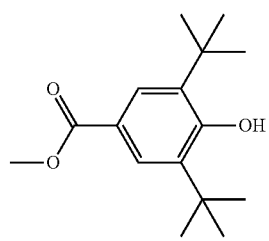
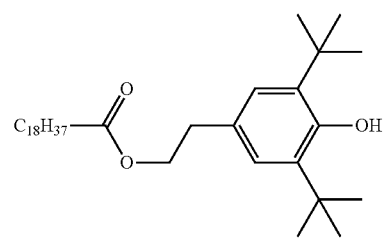
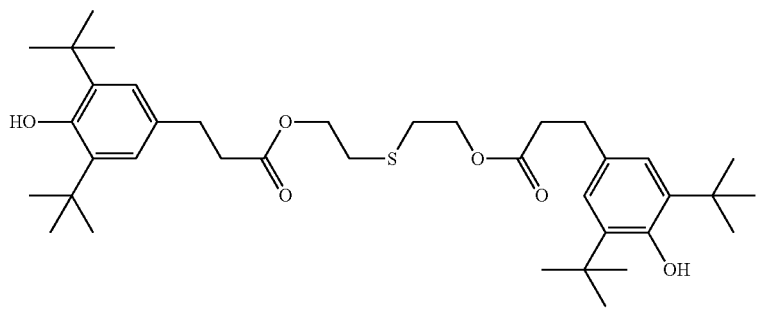
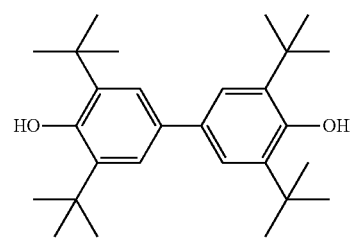
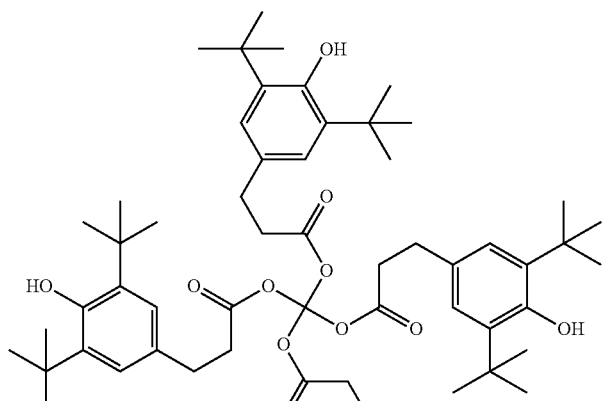
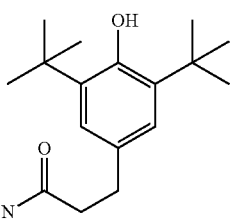

-continued
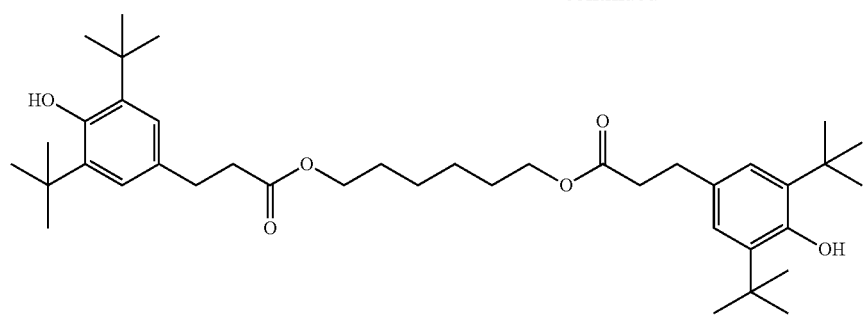
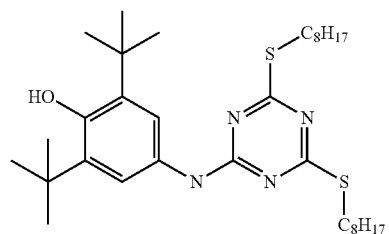
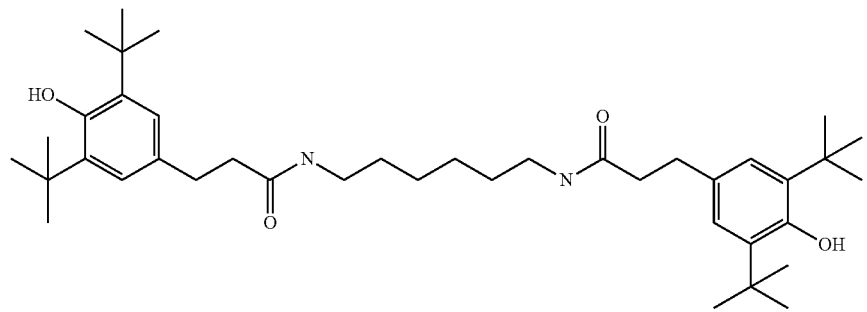
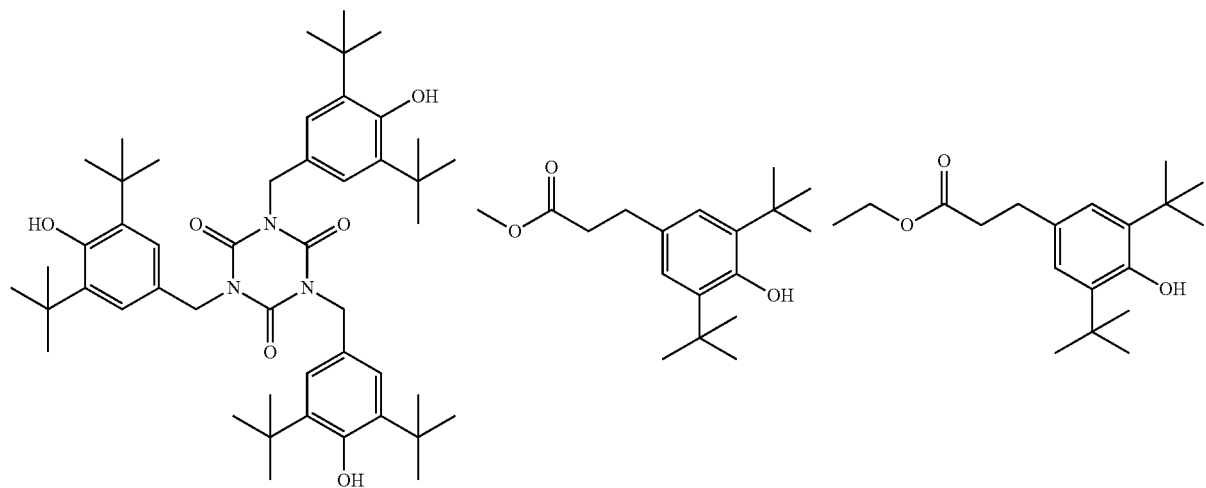

31
-continued
32
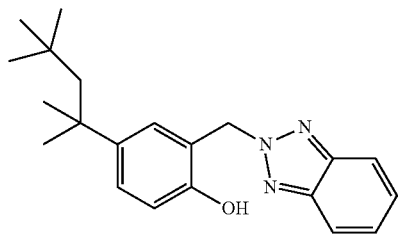 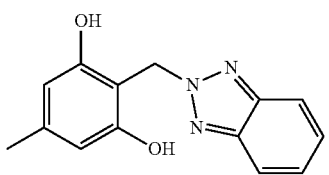 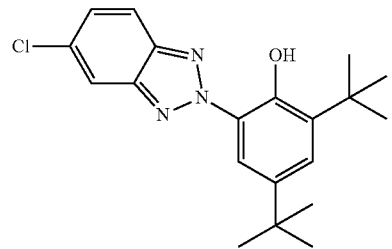
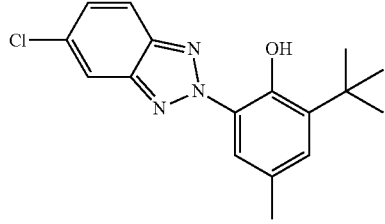 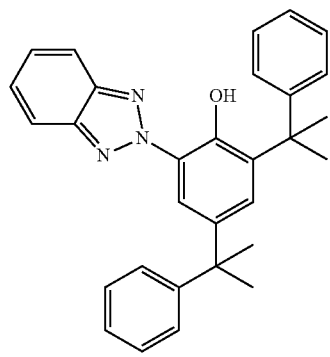 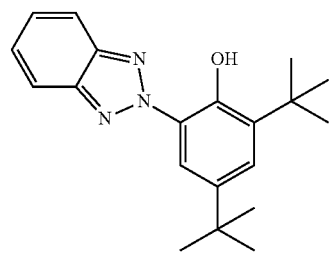
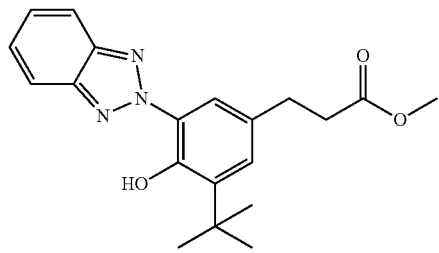 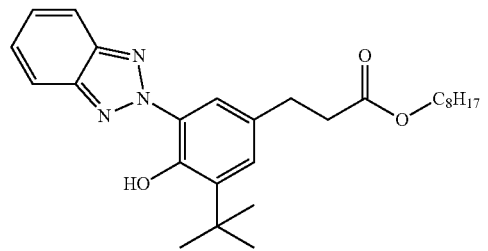
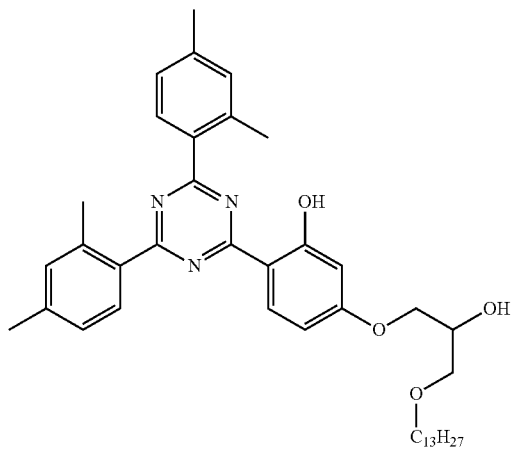 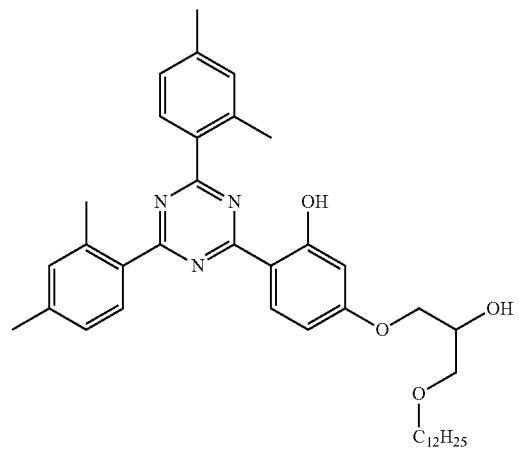

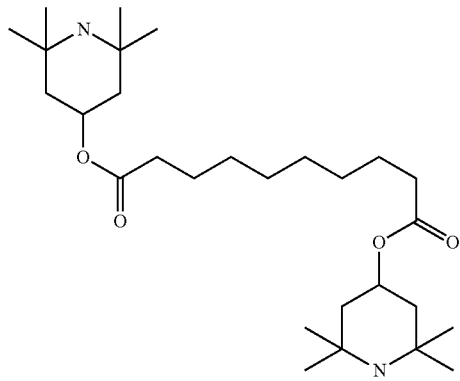
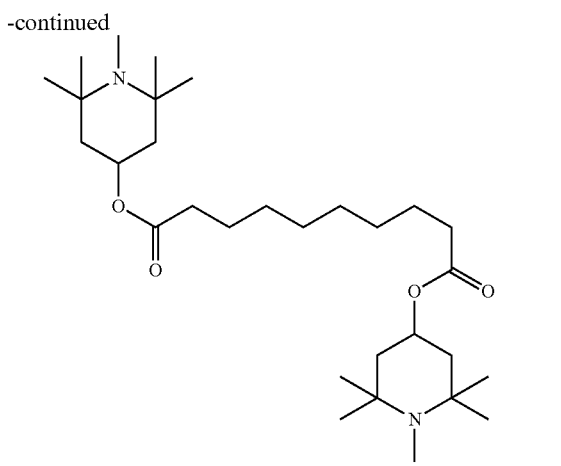

in which, n represents a positive integer of 1-12.

Preferably, the light stabilizer is selected from a group consisting of the light stabilizers as shown below.

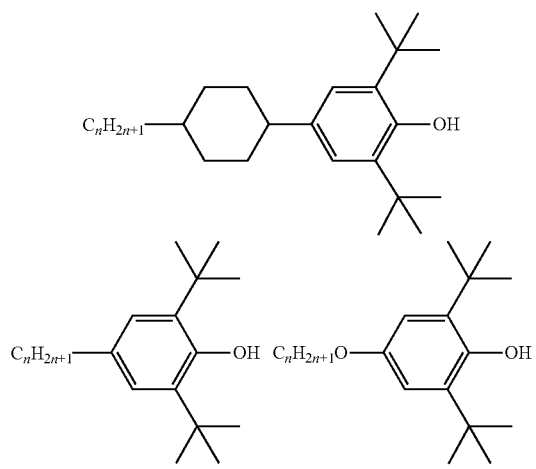

In some embodiments of the present invention, preferably, the light stabilizer provides 0-5% by weight of the total weight of the liquid crystal composition; preferably, 0.01-1% by weight of the total weight of the liquid crystal composition; more preferably, 0.01-0.1% by weight of the total weight of the liquid crystal composition.

The liquid crystal composition containing polymerizable compound of the present invention can be polymerized even in the absence of a polymerization initiator. However, polymerization initiator(s) may be added therein to promote polymerization. Examples of the polymerization initiators employed in the present invention include benzoin ethers, benzophenones, acetophenones, benzyl ketals, acylphosphine oxides, and the like.

The polymerization of the polymerizable compounds in the liquid crystal composition endows the liquid crystal composition of the present invention with the alignment ability, and controls the amount of transmitted light in the liquid crystal display device through the birefringence in the liquid crystal composition.

Preferred polymerization methods for the polymerizable compounds are polymerization with the irradiation of active energy rays, such as ultraviolet rays or electron beams since the polymerization is expected to proceed quickly. In case of ultraviolet ray irradiation, either a polarized light source or an unpolarized light source can be used. In addition, when the polymerization is carried out by sandwiching the liquid crystal composition between two substrates, at least one substrate on the irradiation-receiving side must have an appropriate transparency to the active energy rays. It is also possible to only polymerize a specific region under light irradiation with the aid of mask, and then induce orientation state change of the unpolymerized region upon an external stimulus like the changes in the electric or magnetic field or the temperature. The unpolymerized region is subsequently further polymerized through the initiation of active energy rays. In particular for UV photopolymerization, the polymerizable compounds are preferably polymerized by irradiation with UV light, with a voltage simultaneously being applied to the liquid crystal composition in the display.

The temperature during the irradiation with active energy ray, such as ultraviolet rays and electron beams, is preferably within a range where the liquid crystal compositions of the present invention maintain liquid crystal phase, usually. The polymerization is preferably carried out at a temperature close to room temperature (i.e., 15° C. to 35° C.). The ultraviolet ray generation apparatuses for example include metal halide lamp, high-pressure mercury lamp, and super-high-pressure mercury lamp, etc. The wavelength of the ultraviolet rays for irradiation is preferably outside the absorption wavelength ranges of the non-liquid crystal compositions, and it is preferable to block undesired wavelengths as necessary. The intensity of the ultraviolet rays is preferably 0.1 mW/cm$^2$-50 mW/cm$^2$. However, the intensity of the UV ray is not limited to above and can be changed. Irradiation time of the ultraviolet rays can be properly selected according to its intensity, and is preferably 10-600 seconds.

As used herein, the terms "tilt" and "tilt angle" will be understood to mean a tilted alignment of the liquid crystal molecules relative to the surfaces of the cell in an liquid crystal display device (here preferably a PSA liquid crystal display). The (pre)tilt angle here denotes the average angle (<90°) between the longitudinal molecular axes of the liquid crystal molecules (liquid crystal director) and the surface of the plane-parallel outer plates of the liquid crystal cell. A low (pre)tilt angle value (i.e. a large deviation from 90°) corresponds to a large (pre)tilt.

The present invention also provides a liquid crystal display device comprising the compound of the general formula I of the present invention, preferably a PSA liquid crystal display device, more preferably a liquid crystal display device of PS-VA, PS-OCB, PS-IPS, PS-FFS, PS-UB-FFS, PS-positive-VA or PS-TN.

The present invention also provides a liquid crystal display device comprising the liquid crystal composition according to the present invention, preferably a PSA liquid crystal display device, more preferably a liquid crystal display device of PS-VA, PS-OCB, PS-IPS, PS-FFS, PS-UB-FFS, PS-positive-VA or PS-TN.

Beneficial Effects

As compared to the prior art, the polymerizable liquid crystal composition provided herein has a higher VHR (especially an excellent VHR after UV irradiation), a lower surface roughness of the polymer layer, a lower residual amount of the polymerizable compound, a faster polymerization rate and a better pretilt angle stability, enables the production of a liquid crystal display device with a better voltage stability and a faster response speed, and can effectively reduce or prevent the occurrences of problems such as "burn-in", "image sticking", "Zara Particle" and "uneven display" in the liquid crystal display device. Therefore, the liquid crystal composition and the liquid crystal display device provided herein have high practical values.

DETAILED EMBODIMENTS

The present invention will be illustrated by combining the detailed embodiments below. It should be noted that the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compounds in the following Examples are represented by the codes listed in Table 1:

TABLE 1

Codes of the group structures of the liquid crystal compounds

| Unit structure of group | Code | Name of the group |
|---|---|---|
|  | C | 1,4-cyclohexylidene |
|  | P | 1,4-phenylene |
|  | G | 2-fluoro-1,4-phenylene |
|  | U | 2,6-difluoro-1,4-phenylene |

TABLE 1-continued

Codes of the group structures of the liquid crystal compounds

| Unit structure of group | Code | Name of the group |
|---|---|---|
|  | W | 2,3-difluoro-1,4-phenylene |
| —F | F | fluorine substituent |
| —O— | O | oxygen substituent |
| —CH=CH— or —CH=CH$_2$ | V | ethenyl |
| —CH$_2$O— | 1O | methyleneoxy |
| —OCF$_3$ | OCF3 | trifluoromethoxy |
| —CF$_3$ | CF3 | trifluoromethyl |
|  | Q | difluoromethoxy |
| —CH$_2$CH$_2$— | 2 | ethyl bridge bond |
| —C$_n$H$_{2n+1}$ or —C$_n$H$_{2n}$— | n (n represents a positive integer of 1-12) | alkyl or alkylene |

Take the compound with the following structural formula as an example:

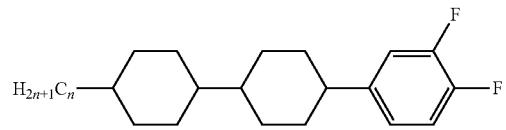

Represented by the codes listed in Table 1, this structural formula can be expressed as nCCGF, in which, n in the code represents the number of the carbon atoms of the alkyl group on the left, for example, n is "3", meaning that the alkyl is —C$_3$H$_7$; C in the code represents "cyclohexyl", G represent 2-fluoro-1,4-phenylene, F represents fluorine substituent.

The abbreviated codes of the test items in the following Examples are represented as follows:

Cp clearing point (nematic-isotropic phases transition temperature, ° C.)
Δn optical anisotropy (589 nm, 25° C.)
Δε dielectric anisotropy (1 KHz, 25° C.)
$γ_1$ rotational viscosity (mPa·s, 25° C.)
$K_{11}$ splay elastic constant
$K_{33}$ bend elastic constant
Tc low temperature phase transition point (minimum temperature of a nematic phase) (° C.)
Ra roughness (nm)
ΔPTA stability of pretilt angle (change in pretilt angle after applying voltage for 120 h) (°)
PTA pretilt angle (°)
VHR (initial) initial voltage holding ratio (%)
VHR (UV) voltage holding ratio after UV-irradiation (%) in which,
Cp is measured with melting point apparatus.
Δn is measured with an Abbe refractometer under sodium lamp (589 nm) light source at 25° C.
Δε=$ε_{//}$−$ε_⊥$, in which, $ε_{//}$ is the dielectric constant parallel to the molecular axis, $ε_⊥$ is the dielectric constant perpendicular to the molecular axis, with the test conditions: 25° C., 1 KHz, VA type test cell with a cell gap of 6 μm.

γ1 is measured using a LCM-2 type liquid crystal physical property evaluation system at 25° C. with a test cell having a cell gap of 20 m and a test voltage of 240 V.

$K_{11}$ and $K_{33}$ are calculated from the measured C-V curve of the liquid crystal material using LCR meter and an antiparallel rubbed cell, with the following test conditions: a cell gap of 7 μm, V=0.1~20V.

Tc: samples each having a nematic phase are put in glass vials and kept in freezers at temperatures of 0° C., −10° C., −20° C., −30° C. and −40° C. for 10 days respectively, and then liquid crystal phases are observed. For example, when the sample maintains the nematic phase at −20° C. and changes to crystals or a smectic phase at −30° C., Tc is expressed as Tc<−20° C.

Ra: after UV photopolymerization of the polymerizable compound contained in the liquid crystal composition, the liquid crystal molecules are rinsed and then the morphological roughness of the polymerized polymer layer is tested with an atomic force microscope (AFM).

PTA: the pretilt angle is measured by crystal rotation method. Liquid crystals are filled into VA type test cell having a cell gap of 3.5 μm. The test cells are exposed to UV irradiation as described in UV1 step with the application of a voltage (16 V, 60 Hz), causing polymerization of the polymerizable compound and generation of pretilt angle PTA1. The test cells are subsequently exposed to UV irradiation as described in UV2 step to remove residual polymerizable compounds and pretilt angle PTA2 is then generated. In the present invention, the polymerization rate of polymerizable compound are investigated through the comparation of the pretilt angles formed after the same exposure time of UV1 irradiation (the smaller the pretilt angle, the faster the polymerization rate) or the times for generating the same pretilt angle (the shorter the time for generating the same pretilt angle, the fast the polymerization rate). After different exposure times of UV2 irradiation, the liquid crystal is rinsed out of the liquid crystal test cell and the concentration of unreacted polymerizable compound in the liquid crystal is measured by HPLC to evaluate the residual amount of the polymerizable compound.

ΔPTA: after the test cell used in the measurement of PTA is subjected to UV1 and UV2 steps to form a pretilt angle of 88±0.2°, 60 Hz square wave, AC voltage (20 V) and DC voltage (2 V) are applied to the test cell at 40° C. with the presence of backlight. After a fixed time period, the pretilt angle of the test cell is tested, and ΔPTA (168 h)=PTA (initial)−PTA (168 h), the smaller the ΔPTA (168 h), the better the stability of the pretilt angle.

VHR (initial) is measured using a TOYO6254 type liquid crystal physical property evaluation system; the test temperature is 60° C., the test voltage is 5 V, and the test frequency is 6 Hz.

VHR (UV) is measured using a TOYO6254 liquid crystal physical property evaluation system; the test temperature is close to room temperature (i.e., 15-35° C.), the UV-irradiation intensity is 0.1 mW/cm$^2$-50 mW/cm$^2$ and the UV-irradiation time is 2 h.

The components used in the following Examples can either be synthesized by method known in the art or be obtained commercially. The synthetic techniques are conventional, and each of the obtained liquid crystal compounds is tested to meet the standards of electronic compound.

The liquid crystal compositions are prepared in accordance with the ratios specified in the following Examples through conventional methods in the art, such as heating, ultrasonic wave, or suspension.

TABLE 2

Structures and codes of polymerizable compounds

| Code of component | Structure of polymerizable compound | Formula Code |
|---|---|---|
| RM-01 | | |
| RM-02 | | |
| RM-03 | | |

TABLE 2-continued

Structures and codes of polymerizable compounds

| Code of component | Structure of polymerizable compound | Formula Code |
|---|---|---|
| RM-1 | | I-12 |
| RM-2 | | I-1 |
| RM-3 | | I-18 |
| RM-4 | | I-1 |
| RM-5 | | I-1 |
| RM-6 | | I-5 |
| RM-7 | | I-18 |

Comparative Examples 1-4 and Examples 1-8

The liquid crystal host mixture Host-1 is prepared according to each compound and weight percentage listed in Table 3 as follows.

TABLE 3

Formulation of the liquid crystal host mixture Host-1 and its test performances

| Code of component | Weight percentage | Formula Code | Test results for the performance parameters | |
|---|---|---|---|---|
| 2CPWO2 | 8 | II-2 | Cp | 74.2 |
| 3CPWO2 | 9.5 | II-2 | $\Delta n$ | 0.1095 |
| 3PWO2 | 11 | II-1 | $\Delta \varepsilon$ | −3.28 |
| 3C1OWO2 | 11 | III-6 | $\gamma_1$ | 77 |
| 3CC1OWO2 | 15.5 | III-7 | Tc | −30 |
| 3CPO2 | 4 | M-2 | | |
| 3CPP2 | 10.5 | M-13 | | |
| 3CC2 | 18 | M-1 | | |
| 5CC2 | 4 | M-1 | | |
| 4CC3 | 4 | M-1 | | |
| 5PP1 | 4.5 | M-3 | | |
| Total | 100 | | | |

Polymerizable compounds RM-01, RM-02 and RM-03 are added into 100 parts by weight of Host-1 to form the compositions of comparative Examples 1-4, and polymerizable compounds RM-1, RM-2, RM-3, RM-4, RM-5, RM-6 and RM-7 are added into 100 parts by weight of Host-1 to form the compositions of Examples 1-8. The specific parts by weight of the polymerizable compounds and the test results of the relevant performance parameters are shown as follows in Table 4.

From Table 4, it can be seen that, when the host liquid crystal Host-1 is the same and only the polymerizable compounds are different, as compared to Comparative Examples 1-4 (liquid crystal compositions in the prior art), the liquid crystal compositions of the present invention have a higher voltage holding ratio (especially an excellent voltage holding ratio after UV irradiation), and a higher reliability; the polymer layer formed by the polymerizable compounds in the liquid crystal composition of the present invention has a lower surface roughness, and a higher uniformity. It can be seen from the data of PTA1 formed after the application of UV1 for different time to the liquid crystal composition that the liquid crystal composition of the present invention has a faster polymerization rate and a faster response speed; according to the test results of polymer residue, the liquid crystal composition of the present invention can achieve a lower residual polymer content and a faster response speed; according to the pretilt angle stability test results, after the generation of pretilt angel, the liquid crystal composition of the present invention shows a smaller change in the pretilt angle under the driving of voltage and thus has a better pretilt angle stability.

Comparative Examples 5-7 and Examples 9-16

The liquid crystal host mixture Host-2 is prepared according to each compound and weight percentage listed in Table 5 as follows.

TABLE 4

Formulation of the liquid crystal compositions of Comparative Examples 1-4 and Examples 1-8 and the test performances

| | | Comparative Example No. | | | | Example No. | | | | | | | |
|---|---|---|---|---|---|---|---|---|---|---|---|---|---|
| | | 1 | 2 | 3 | 4 | 1 | 2 | 3 | 4 | 5 | 6 | 7 | 8 |
| Polymerizable compound and its content | RM-01 | | 0.28 | 0.32 | | | | | | | | | |
| | RM-02 | 0.28 | | | 0.28 | | | | | | | | |
| | RM-03 | | | | 0.01 | | | | | | | | |
| | RM-1 | | | | | 0.28 | | | 0.32 | | | | |
| | RM-2 | | | | | | 0.28 | 0.28 | | | | | |
| | RM-3 | | | | | | | 0.01 | 0.01 | | | | |
| | RM-4 | | | | | | | | | 0.28 | | | |
| | RM-5 | | | | | | | | | | 0.28 | | 0.28 |
| | RM-6 | | | | | | | | | | | 0.28 | |
| | RM-7 | | | | | | | | | | | | 0.01 |
| VHR (initial) (%) | | 93.24 | 93.94 | 94.24 | 93.76 | 94.42 | 95.13 | 95.53 | 94.42 | 94.36 | 95.1 | 95.53 | 94.52 |
| VHR (UV) (%) | | 95.45 | 95.85 | 96.15 | 95.69 | 96.76 | 96.83 | 96.95 | 96.96 | 96.66 | 96.85 | 96.85 | 96.96 |
| Ra (nm) | | 14.8 | 14.7 | 14.9 | 14.5 | 11.7 | 11.7 | 11.5 | 11.6 | 11.9 | 11.8 | 11.4 | 11.6 |
| PTA1 (°) formed after UV1 step for different times | 100 s | 88.88 | 88.83 | 88.78 | 88.72 | 88.44 | 88.42 | 88.35 | 88.3 | 88.42 | 88.41 | 88.42 | 88.36 |
| | 120 s | 87.85 | 87.74 | 87.65 | 87.56 | 87.4 | 87.4 | 87.37 | 87.3 | 87.4 | 87.5 | 87.4 | 87.37 |
| | 150 s | 86.97 | 86.92 | 86.78 | 86.76 | 86.5 | 86.6 | 86.4 | 86.3 | 86.5 | 86.5 | 86.5 | 86.4 |
| Residual content of polymerizable compound after UV2 step for 90 min (ppm) | | 208 | 210 | 227 | 198 | 148 | 139 | 114 | 148 | 157 | 141 | 147 | 124 |
| Pretilt angle stability test (°) | PTA (initial) | 88.06 | 88.05 | 88.09 | 88.03 | 87.95 | 88.05 | 87.98 | 87.96 | 88.11 | 88.06 | 88.14 | 87.91 |
| | PTA (24 h) | 87.91 | 87.90 | 87.98 | 87.91 | 87.86 | 87.95 | 87.90 | 87.80 | 88.02 | 87.94 | 88.05 | 87.83 |
| | PTA (72 h) | 87.81 | 87.79 | 87.87 | 87.80 | 87.78 | 87.87 | 87.82 | 87.69 | 87.94 | 87.87 | 87.97 | 87.75 |
| | PTA (120 h) | 87.67 | 87.68 | 87.67 | 87.69 | 87.71 | 87.81 | 87.75 | 87.68 | 87.87 | 87.82 | 87.90 | 87.69 |
| | PTA (168 h) | 87.60 | 87.58 | 87.59 | 87.61 | 87.65 | 87.77 | 87.68 | 87.64 | 87.81 | 87.77 | 87.84 | 87.64 |
| | $\Delta$PTA (168 h) | 0.46 | 0.47 | 0.5 | 0.42 | 0.3 | 0.28 | 0.3 | 0.32 | 0.3 | 0.29 | 0.3 | 0.27 |

TABLE 5

Formulation of the liquid crystal host mixture Host-2 and its test performances

| Code of component | Weight percentage | Formula Code | Test results for the performance parameters | |
|---|---|---|---|---|
| 3PWO1 | 5.5 | II-1 | Cp | 76.1 |
| 3PWO2 | 9.5 | II-1 | $\Delta n$ | 0.094 |
| 3CPWO2 | 6.5 | II-2 | $\Delta \varepsilon$ | −3.3 |
| 3CWO2 | 14.5 | III-1 | $K_{11}$ | 13.2 |
| 3CCWO2 | 9 | III-2 | $K_{33}$ | 14.8 |
| 3CCWO3 | 7 | III-2 | $\gamma_1$ | 91 |
| 2CCWO2 | 8 | III-2 | | |
| 3CC2 | 10 | M-1 | | |
| 4CC3 | 6 | M-1 | | |
| 5CC3 | 6 | M-1 | | |
| 3CCP1 | 10 | M-12 | | |
| 3CCV1 | 8 | M-1 | | |
| Total | 100 | | | |

Polymerizable compounds RM-01, RM-02 and RM-03 are added into 100 parts by weight of Host-2 to form the compositions of Comparative Examples 5-7, and polymerizable compounds RM-1, RM-2, RM-3, RM-4, RM-5, RM-6 and RM-7 are added into 100 parts by weight of Host-2 to form the compositions of Examples 9-16. The specific parts by weight of the polymerizable compounds and the test results of the relevant performance parameters are shown as follows in Table 6.

uniformity. It can be seen from the data of PTA1 formed after the application of UV1 for different time to the liquid crystal composition that the liquid crystal composition of the present invention has a faster polymerization rate and a faster response speed; according to the test results of polymer residue, the liquid crystal composition of the present invention can achieve a lower residual polymer content and a faster response speed; according to the pretilt angle stability test results, after the generation of pretilt angel, the liquid crystal composition of the present invention shows a smaller change in the pretilt angle under the driving of voltage and thus has a better pretilt angle stability.

Comparative Examples 8-10 and Examples 17-24

The liquid crystal host mixture Host-3 is prepared according to each compound and weight percentage listed in Table 7 as follows.

TABLE 7

Formulation of the liquid crystal host mixture Host-3 and its test performances

| Code of component | Weight percentage | Formula Code | Test results for the performance parameters | |
|---|---|---|---|---|
| 3C1OWO2 | 14 | III-6 | Cp | 77 |
| 4C1OWO2 | 6 | III-6 | $\Delta n$ | 0.095 |

TABLE 6

Formulation of the liquid crystal compositions of Comparative Examples 5-7 and Examples 9-16 and the test performances

| | | Comparative Example No. | | | Example No. | | | | | | | |
|---|---|---|---|---|---|---|---|---|---|---|---|---|
| | | 5 | 6 | 7 | 9 | 10 | 11 | 12 | 13 | 14 | 15 | 16 |
| Polymerizable compound and its content | RM-01 | 0.3 | | | | | | | | | | |
| | RM-02 | | 0.3 | 0.28 | | | | | | | | |
| | RM-03 | | | 0.02 | | | | | | | | |
| | RM-1 | | | | 0.3 | | | | | | | |
| | RM-2 | | | | | 0.3 | 0.35 | 0.28 | | | | |
| | RM-3 | | | | | | | 0.02 | | | | |
| | RM-4 | | | | | | | | 0.3 | | | |
| | RM-5 | | | | | | | | | 0.3 | | |
| | RM-6 | | | | | | | | | | 0.3 | 0.28 |
| | RM-7 | | | | | | | | | | | 0.02 |
| VHR (initial) (%) | | 93.95 | 93.34 | 93.76 | 94.43 | 95.14 | 95.53 | 94.42 | 94.4 | 95.15 | 95.57 | 94.5 |
| VHR (UV) (%) | | 95.86 | 95.48 | 95.69 | 96.77 | 96.85 | 96.95 | 96.95 | 96.78 | 96.84 | 96.87 | 96.89 |
| Ra (nm) | | 14.1 | 14.7 | 14.6 | 11.9 | 11.8 | 11.5 | 11.6 | 11.6 | 11.4 | 11.5 | 11.5 |
| PTA1 (°) formed after UV1 step for different times | 100 s | 88.7 | 88.9 | 88.6 | 88.3 | 88.4 | 88.2 | 88.0 | 88.3 | 88.4 | 88.3 | 88.1 |
| | 120 s | 88.3 | 88.4 | 88.2 | 87.7 | 87.8 | 87.7 | 87.6 | 87.8 | 87.7 | 87.8 | 87.8 |
| | 150 s | 87.6 | 87.8 | 87.5 | 87.1 | 87.2 | 87.2 | 86.7 | 87.0 | 87.1 | 87.2 | 86.9 |
| Residual content of polymerizable compound after UV2 step for 90 min (ppm) | | 185 | 234 | 179 | 137 | 134 | 164 | 111 | 139 | 145 | 136 | 117 |
| Pretilt angle stability test (°) | PTA (initial) | 88.02 | 88.07 | 88.11 | 88.03 | 87.96 | 88.01 | 88.04 | 88.08 | 88.05 | 88.03 | 88.13 |
| | PTA (24 h) | 87.88 | 87.96 | 88.04 | 87.95 | 87.88 | 87.94 | 87.97 | 88.03 | 88.00 | 87.95 | 88.09 |
| | PTA (72 h) | 87.76 | 87.85 | 87.96 | 87.89 | 87.81 | 87.86 | 87.91 | 87.96 | 88.94 | 87.87 | 88.05 |
| | PTA (120 h) | 87.66 | 87.70 | 87.76 | 87.83 | 87.73 | 87.82 | 87.84 | 87.87 | 87.86 | 87.82 | 88.02 |
| | PTA (168 h) | 87.6 | 87.63 | 87.71 | 87.76 | 87.71 | 87.77 | 87.81 | 87.82 | 87.78 | 87.78 | 87.9 |
| | $\Delta$PTA (168 h) | 0.42 | 0.44 | 0.40 | 0.27 | 0.25 | 0.24 | 0.23 | 0.26 | 0.27 | 0.25 | 0.23 |

From Table 6, it can be seen that, when the host liquid crystal Host-2 is the same and only the polymerizable compounds are different, as compared to Comparative Examples 5-7 (liquid crystal compositions in the prior art), the liquid crystal compositions of the present invention have a higher voltage holding ratio (especially an excellent voltage holding ratio after UV irradiation), and a higher reliability; the polymer layer formed by the polymerizable compounds in the liquid crystal composition of the present invention has a lower surface roughness, and a higher

TABLE 7-continued

Formulation of the liquid crystal host mixture Host-3 and its test performances

| Code of component | Weight percentage | Formula Code | Test results for the performance parameters | |
|---|---|---|---|---|
| 2CC1OWO2 | 4.5 | III-7 | $\Delta \varepsilon$ | −3.1 |
| 3CC1OWO2 | 9.5 | III-7 | $K_{11}$ | 14 |

TABLE 7-continued

Formulation of the liquid crystal host mixture
Host-3 and its test performances

| Code of component | Weight percentage | Formula Code | Test results for the performance parameters | |
|---|---|---|---|---|
| 3CCWO2 | 3.5 | III-2 | $K_{33}$ | 14.4 |
| 3CPWO2 | 7 | II-2 | $\gamma_1$ | 91 |
| 3CPO2 | 9 | M-2 | | |
| 3CPP2 | 10.5 | M-13 | | |
| 3CPPC3 | 1.5 | M-22 | | |
| 3CC2 | 20 | M-1 | | |
| 5CC2 | 3 | M-1 | | |
| 4CC3 | 5 | M-1 | | |
| 5PP1 | 4.5 | M-3 | | |
| 3CGPC2 | 2 | M-23 | | |
| Total | 100 | | | |

Polymerizable compounds RM-01, RM-02 and RM-03 are added into 100 parts by weight of Host-3 to form the compositions of Comparative Examples 8-10, and polymerizable compounds RM-1, RM-2, RM-3, RM-4, RM-5, RM-6 and RM-7 are added into 100 parts by weight of Host-3 to form the compositions of Examples 17-24. The specific parts by weight of the polymerizable compounds and the test results of the relevant performance parameters are shown as follows in Table 8.

TABLE 8

Formulation of the liquid crystal compositions of Comparative Examples 8-10 and Examples 17-24 and the test performances

| | | Comparative Example No. | | | Example No. | | | | | | | |
|---|---|---|---|---|---|---|---|---|---|---|---|---|
| | | 8 | 9 | 10 | 17 | 18 | 19 | 20 | 21 | 22 | 23 | 24 |
| Polymerizable compound and its content | RM-01 | 0.3 | | | | | | | | | | |
| | RM-02 | | 0.3 | 0.28 | | | | | | | | |
| | RM-03 | | | 0.02 | | | | | | | | |
| | RM-1 | | | | 0.3 | | | | | | | |
| | RM-2 | | | | | 0.3 | 0.35 | 0.28 | | | | |
| | RM-3 | | | | | | | 0.02 | | | | |
| | RM-4 | | | | | | | | 0.3 | | | |
| | RM-5 | | | | | | | | | 0.3 | | |
| | RM-6 | | | | | | | | | | 0.3 | 0.28 |
| | RM-7 | | | | | | | | | | | 0.02 |
| VHR (initial) (%) | | 93.85 | 93.34 | 93.65 | 94.48 | 95.16 | 95.54 | 94.42 | 94.58 | 95.26 | 95.44 | 94.68 |
| VHR (UV) (%) | | 95.66 | 95.48 | 95.57 | 96.76 | 96.83 | 96.95 | 96.56 | 96.76 | 96.73 | 96.75 | 96.96 |
| Ra (nm) | | 14.7 | 14.6 | 14.8 | 12.5 | 11.7 | 11.6 | 12.4 | 11.5 | 11.9 | 11.8 | 12.4 |
| PTA1 (°) formed after UV1 step for different times | 100 s | 88.82 | 88.86 | 88.77 | 88.46 | 88.45 | 88.40 | 88.35 | 88.4 | 88.42 | 88.41 | 88.36 |
| | 120 s | 87.74 | 87.84 | 87.68 | 87.41 | 87.4 | 87.36 | 87.32 | 87.42 | 87.4 | 87.38 | 87.34 |
| | 150 s | 86.92 | 86.98 | 86.86 | 86.52 | 86.5 | 86.47 | 86.4 | 86.49 | 86.5 | 86.49 | 86.43 |
| Residual content of polymerizable compound after UV2 step for 90 min (ppm) | | 218 | 220 | 237 | 158 | 159 | 168 | 126 | 157 | 148 | 152 | 130 |
| Pretilt angle stability test (°) | PTA (initial) | 88.05 | 88.06 | 88.03 | 87.98 | 88.05 | 87.98 | 87.96 | 88.01 | 88.06 | 88.04 | 87.97 |
| | PTA (24 h) | 87.90 | 87.91 | 87.91 | 87.86 | 87.95 | 87.87 | 87.82 | 88.90 | 87.94 | 88.93 | 87.87 |
| | PTA (72 h) | 87.79 | 87.81 | 87.80 | 87.78 | 87.86 | 87.80 | 87.74 | 87.82 | 87.87 | 87.82 | 87.78 |
| | PTA (120 h) | 87.68 | 87.67 | 87.69 | 87.71 | 87.78 | 87.74 | 87.70 | 87.74 | 87.79 | 87.76 | 87.73 |
| | PTA (168 h) | 87.6 | 87.59 | 87.6 | 87.67 | 87.73 | 87.69 | 87.68 | 87.69 | 87.75 | 87.72 | 87.7 |
| | ΔPTA (168 h) | 0.45 | 0.47 | 0.43 | 0.31 | 0.32 | 0.29 | 0.28 | 0.32 | 0.31 | 0.32 | 0.27 |

From Table 8, it can be seen that, when the host liquid crystal Host-3 is the same and only the polymerizable compounds are different, as compared to Comparative Examples 8-10 (liquid crystal compositions in the prior art), the liquid crystal compositions of the present invention have a higher voltage holding ratio (especially an excellent voltage holding ratio after UV irradiation), and a higher reliability; the polymer layer formed by the polymerizable compounds in the liquid crystal composition of the present invention has a lower surface roughness, and a higher uniformity. It can be seen from the data of PTA1 formed after the application of UV1 for different time to the liquid crystal composition that the liquid crystal composition of the present invention has a faster polymerization rate and a faster response speed; according to the test results of polymer residue, the liquid crystal composition of the present invention can achieve a lower residual polymer content and a faster response speed; according to the pretilt angle stability test results, after the generation of pretilt angel, the liquid crystal composition of the present invention shows a smaller change in the pretilt angle under the driving of voltage and thus has a better pretilt angle stability.

In conclusion, the liquid crystal composition containing polymerizable compound provided herein has a higher VHR (especially an excellent VHR after UV irradiation), a lower surface roughness of the polymer layer, a faster polymerization rate, a lower residual amount of the polymerizable compound and a better pretilt angle stability, enables the production of a liquid crystal display device with a better voltage stability and a faster response speed, and can effectively reduce or prevent the occurrences of problems such as "burn-in", "image sticking", "Zara Particle" and "uneven display" in the liquid crystal display device. Therefore, the liquid crystal composition and the liquid crystal display device provided herein have high practical values.

The above embodiments are merely illustrative of the technical concepts and the features of the present invention, are included merely for purposes of illustration and implement of the present invention, and are not intended to limit the scope of the present invention. Equivalent variations or modifications are intended to be included within the scope of the present invention.

What is claimed is:

1. A liquid crystal composition containing polymerizable compounds, comprising:

at least one compound of general Formula I

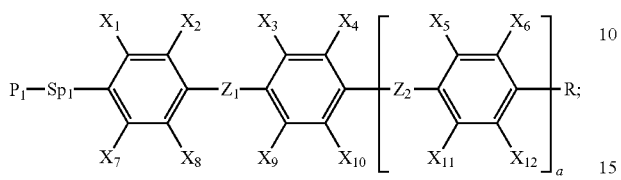

at least one compound of general Formula II

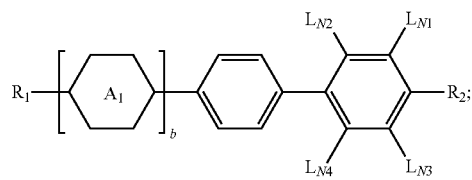

and at least one compound of general Formula M

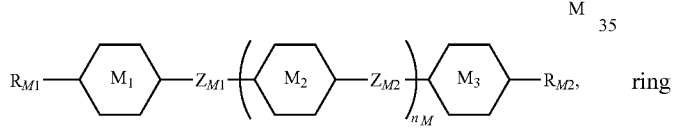

in which,

R and $X_1$-$X_{12}$ each independently represents —H, halogen, —CN, -$Sp_2$-$P_2$ or $C_{1-12}$ linear, branched or cyclic alkyl, wherein one or more nonadjacent —$CH_2$— in the $C_{1-12}$ linear, branched or cyclic alkyl can each be independently replaced by —CH=CH—, —C≡C—, —O—, —CO—, —CO—O— or —O—CO—, and one or more —H in the $C_{1-12}$ linear, branched or cyclic alkyl can each be independently substituted by —F or —Cl, wherein at least one of $X_1$-$X_{12}$ represents —Cl;

$P_1$ and $P_2$ each independently represents a polymerizable group;

$Sp_1$ and $Sp_2$ each independently represents spacer group or single bond;

$R_1$, $R_2$, $R_{M1}$ and $R_{M2}$ each independently represents $C_{1-12}$ linear or branched alkyl,

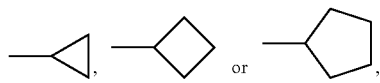

wherein one or more nonadjacent —$CH_2$— in the $C_{1-12}$ linear or branched alkyl can each be independently replaced by —CH=CH—, —C≡C—, —O—, —CO—, —CO—O— or —O—CO—;

ring

represents

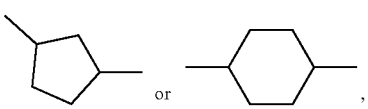

wherein one or more —$CH_2$— in

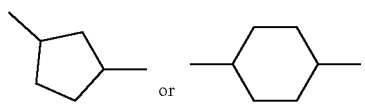

can be replaced by —O—, and one or more single bonds in the ring can be replaced by double bond:

ring

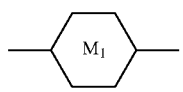

ring

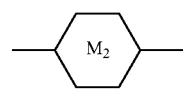

and ring

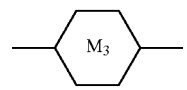

each independently represents

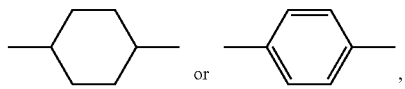

wherein one or more —$CH_2$— in

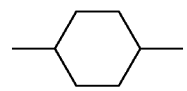

can be replaced by —O—, and one or more single bonds in the ring can be replaced by double bond; at most one —H on

can be substituted by halogen;

$Z_1$ and $Z_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —CH=CF—, —CF=CH—, —C≡C—, —CH=CH—CO—O—, —O—CO—CH=CH—, —CH$_2$CH$_2$—CO—O—, —O—CO—CH$_2$CH$_2$—, —CR$^1$R$^2$— or single bond, wherein $R^1$ and $R^2$ each independently represents —H or C$_{1-12}$ linear or branched alkyl, and n represents a integer from 1 to 4;

$Z_{M1}$ and $Z_{M2}$ each independently represents single bond, —CO—O—, —O—CO—, —CH$_2$O—, —OCH$_2$—, —C≡C—, —CH=CH— —CH$_2$CH$_2$— or —(CH$_2$)$_4$—;

$L_{N1}$ and $L_{N2}$ each independently represents —F or —Cl;

$L_{N3}$ and $L_{N4}$ each independently represents —H, C$_{1-3}$ alkyl or halogen;

a represents 0, 1 or 2, and when a=2, ring

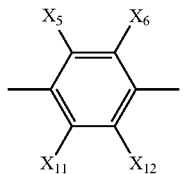

can be same or different, $Z_2$ can be same or different;

b represents 0, 1 or 2, when b=2, ring

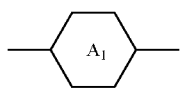

can be same or different; and $n_M$ represents 0, 1, 2 or 3, when $n_M$=2, ring

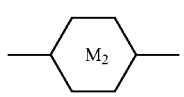

can be same or different, $Z_{M2}$ can be same or different.

2. The liquid crystal composition according to claim 1, wherein R represents -Sp$_2$-P$_2$.

3. The liquid crystal composition according to claim 1, wherein a represents 0 or 1.

4. The liquid crystal composition according to claim 1, wherein the compound of general Formula I is selected from a group consisting of the following compounds:

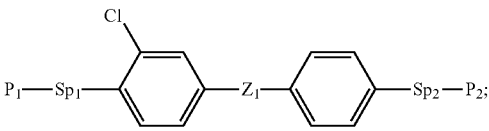
I-1

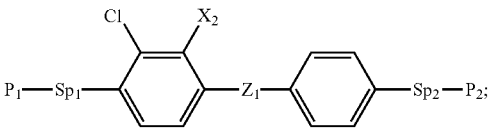
I-2

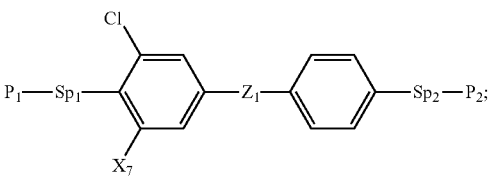
I-3

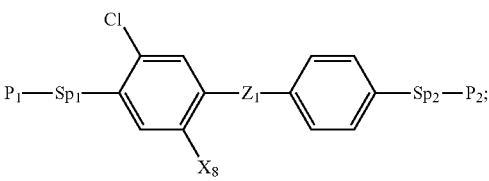
I-4

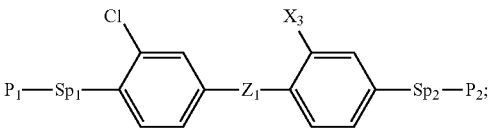
I-5

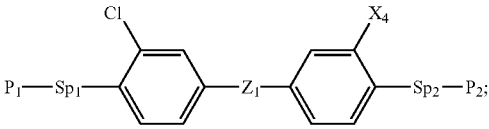
I-6

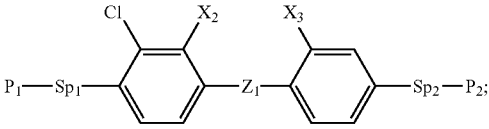
I-7

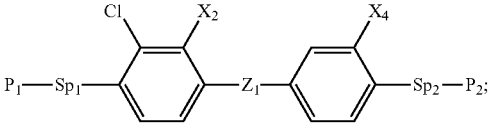
I-8

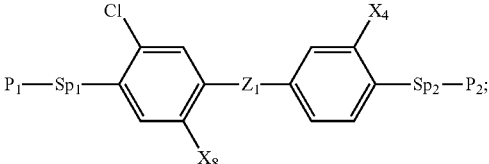
I-9

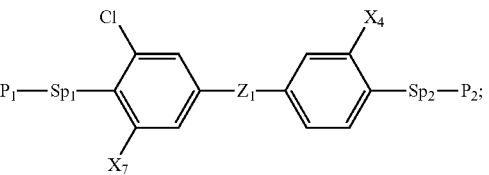
I-10

I-11 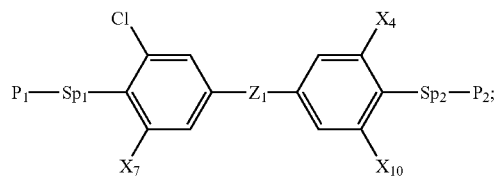
I-12 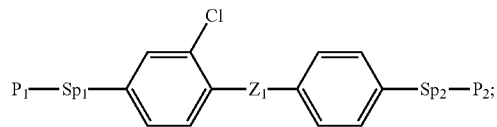
I-13 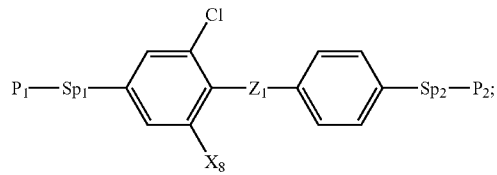
I-14 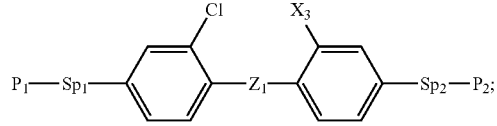
I-15 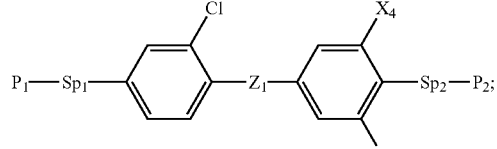
I-16 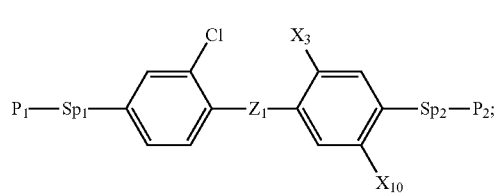
I-17 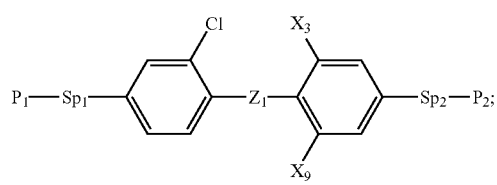
I-18 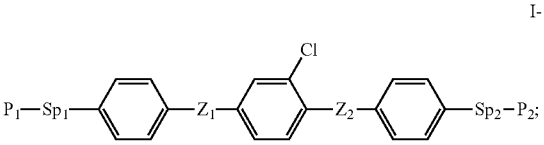
I-19 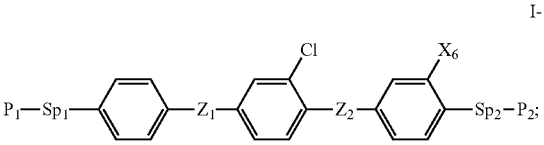
I-20 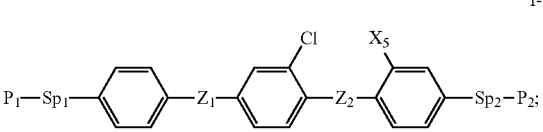
I-21 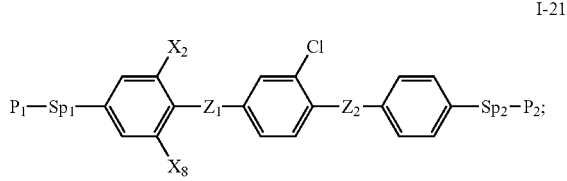
I-22 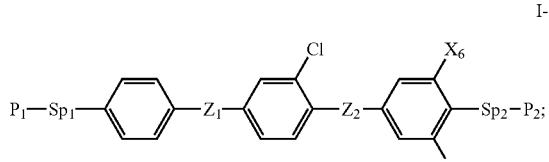
I-23 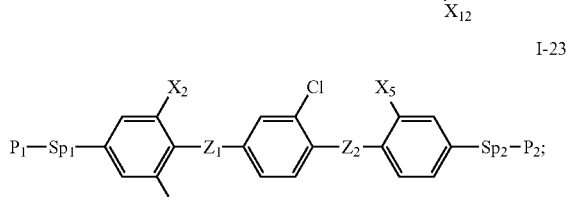
I-24 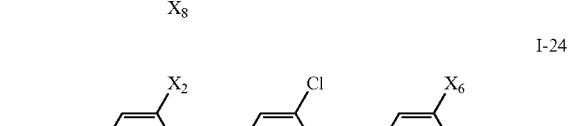
I-25 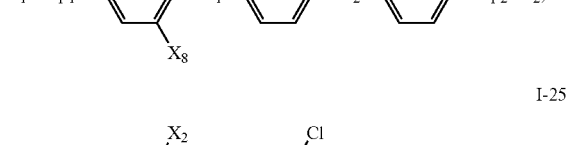
I-26 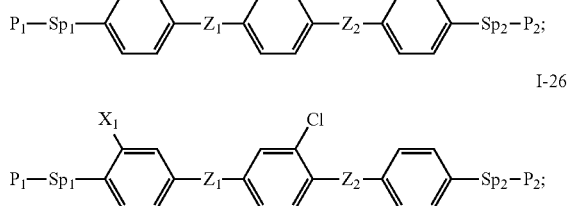
I-27 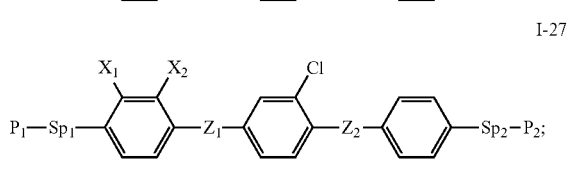
I-28 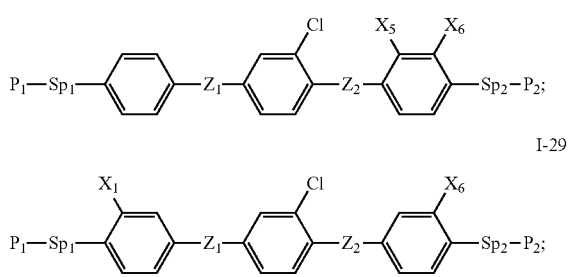
I-29 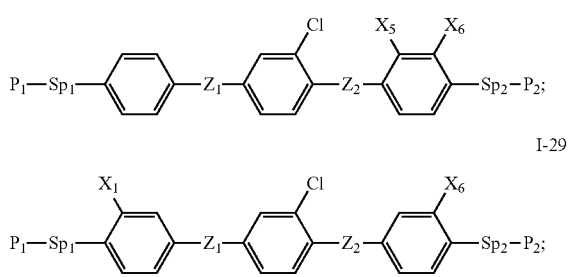
I-30 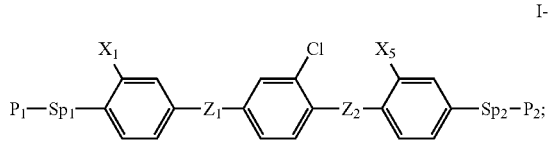

-continued

I-31
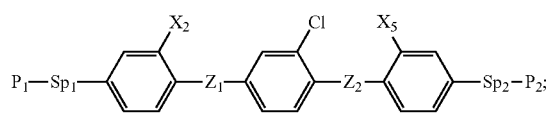

I-32
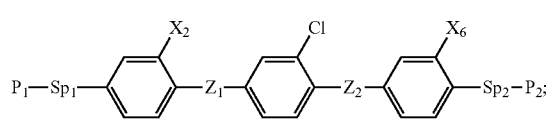

I-33
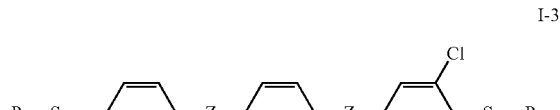

I-34
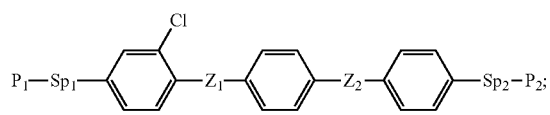

I-35
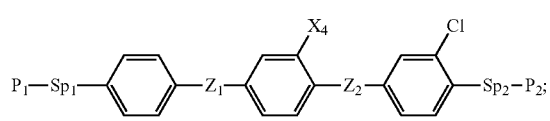

I-36
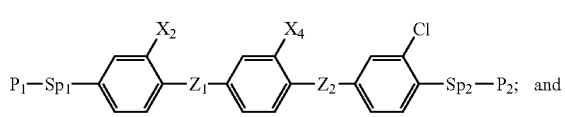

I-37
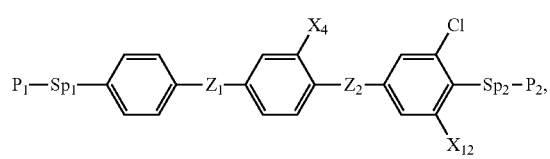

in which, $X_1$-$X_{12}$ each independently represents —F, —Cl, —$Sp_2$-$P_2$, or $C_{1-5}$ linear, branched or cyclic alkyl or alkoxy.

5. The liquid crystal composition according to claim 1, wherein the compound of general Formula II is selected from a group consisting of the following compounds:

II-1
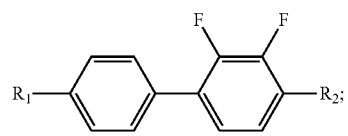

II-2
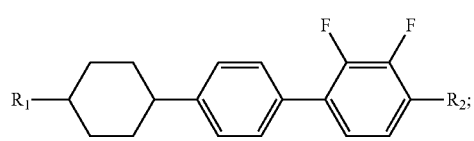

II-3
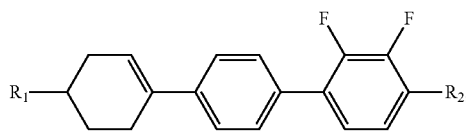

II-4
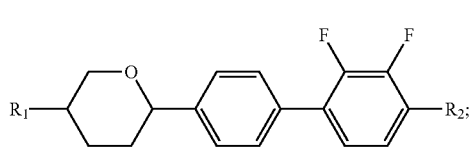

II-5
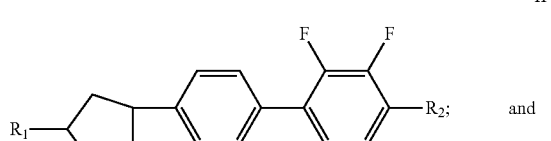

and

II-6
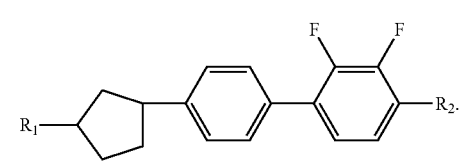

6. The liquid crystal composition according to claim 1, wherein the compound of general Formula I provides 0.001%-5% by weight of the total weight of the liquid crystal composition, the compound of general Formula II provides 1%-45% by weight of the total weight of the liquid crystal composition, and the compound of general Formula M provides 1%-80% by weight of the total weight of the liquid crystal composition.

7. The liquid crystal composition according to claim 1, further comprising at least one compound of general Formula III and at least one compound of general Formula IV:

III
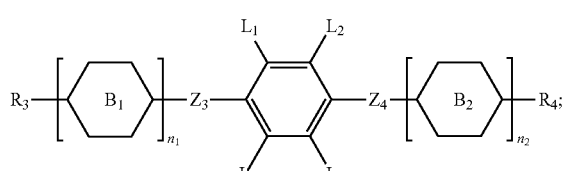

IV
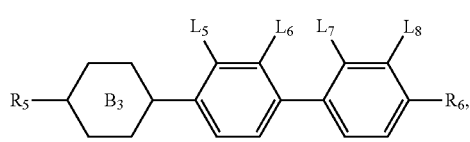

in which, $R_3$, $R_4$, $R_5$ and $R_6$ each independently represents $C_{1-12}$ linear or branched alkyl,

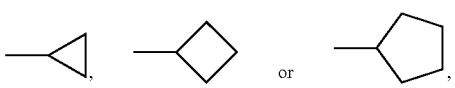

wherein one or more nonadjacent —CH$_2$— in the C$_{1-12}$ linear or branched alkyl can each be independently replaced by —CH=CH—, —C≡C—, —O—, —CO—, —CO—O— or —O—CO—;

ring

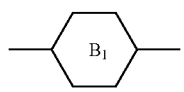

and ring

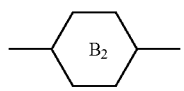

each independently represents

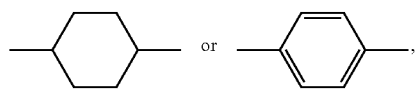

wherein one or more —CH$_2$— in

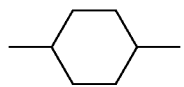

can be replaced by —O—, and one or more single bonds in the ring can be replaced by double bond; one or more —H on

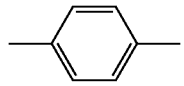

can be substituted by —F, —Cl or —CN, and one or more —CH= in the ring can be replaced by —N=;

ring

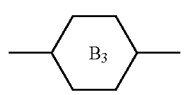

represents,

wherein one or more —H on

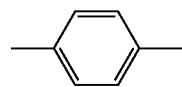

can be substituted by —F, —Cl or —CN, and one or more —CH= in the ring can be replaced by —N=;

L$_1$ and L$_2$ each independently represents —F or —Cl;
L$_3$ and L$_4$ each independently represents —H, C$_{1-3}$ alkyl or halogen;
L$_5$, L$_6$, L$_7$ and L$_8$ each independently represents —H, —F or —Cl, wherein at least two of L$_5$, L$_6$, L$_7$ and L$_8$ represents —F or —Cl, and when only two of L$_5$, L$_6$, L$_7$ and L$_8$ represents —F or —Cl, —F and —Cl are on the same benzene ring;
Z$_3$ and Z$_4$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—,
wherein ring

is non-aromatic ring when Z$_3$ represents single bond;
n$_1$ represents 1 or 2, and when n$_1$=2, ring

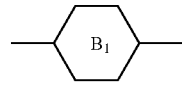

can be same or different; and
n$_2$ represents 0 or 1.

8. The liquid crystal composition according to claim 7, wherein the compound of general Formula III is selected from the following compounds:

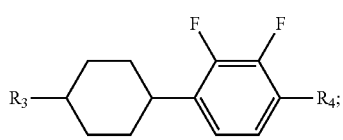
III-1

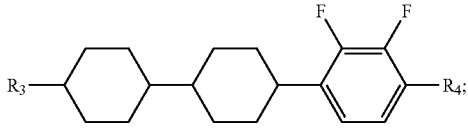
III-2

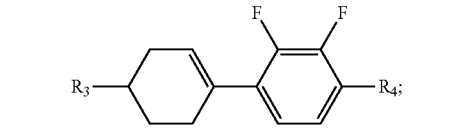
III-3

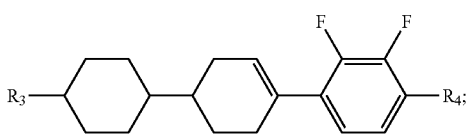
III-4

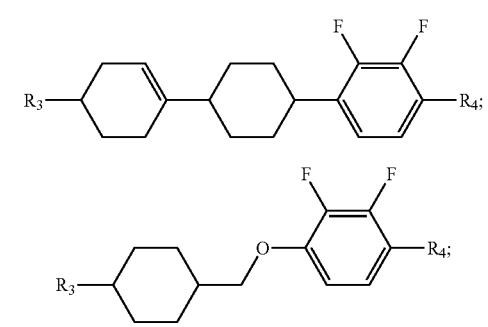

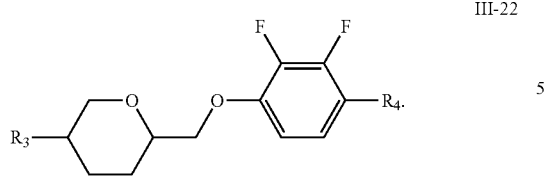

III-22

9. The liquid crystal composition according to claim 7, wherein the compound of general Formula III provides 1%-50% by weight of the total weight of the liquid crystal composition, and the compound of general Formula IV provides 1%-20% by weight of the total weight of the liquid crystal composition.

10. A liquid crystal display device comprising the liquid crystal composition according to claim 1.

* * * * *